United States Patent
Ito

(10) Patent No.: US 6,628,204 B1
(45) Date of Patent: Sep. 30, 2003

(54) ODOR COMMUNICATION SYSTEM IN MULTIMEDIA

(75) Inventor: Yukio Ito, Tokyo (JP)

(73) Assignee: ITO Engineering Inc., Kuwana (JP)

( * ) Notice: Subject to any disclaimer, the term of this patent is extended or adjusted under 35 U.S.C. 154(b) by 0 days.

(21) Appl. No.: 09/509,034

(22) PCT Filed: Sep. 9, 1998

(86) PCT No.: PCT/JP98/04029
§ 371 (c)(1),
(2), (4) Date: Feb. 20, 2001

(87) PCT Pub. No.: WO99/67763
PCT Pub. Date: Dec. 29, 1999

(30) Foreign Application Priority Data

Jun. 23, 1998 (JP) .......................... 10-191013

(51) Int. Cl.[7] ................................. G08B 3/00
(52) U.S. Cl. ................................... 340/691.2
(58) Field of Search .............. 340/691.2, 500, 340/506, 514, 515, 517, 521, 600, 632, 693.6

(56) References Cited

U.S. PATENT DOCUMENTS

| | | | | |
|---|---|---|---|---|
| 4,243,224 A | * | 1/1981 | Spector | 273/157 R |
| 4,404,923 A | * | 9/1983 | Smith | 116/214 |
| 4,415,533 A | * | 11/1983 | Kurotori et al. | 422/4 |
| 4,456,902 A | * | 6/1984 | Komine et al. | 338/34 |
| 4,458,233 A | * | 7/1984 | Komine et al. | 338/34 |
| 4,548,217 A | * | 10/1985 | Saculla | 131/235.1 |
| 4,629,604 A | * | 12/1986 | Spector | 422/124 |
| 4,798,935 A | * | 1/1989 | Pezaria | 219/492 |
| 5,675,070 A | | 10/1997 | Gelperin | |
| 5,724,256 A | | 3/1998 | Lee et al. | |
| 5,767,385 A | * | 6/1998 | Bundy et al. | 73/23.34 |
| 6,261,679 B1 | * | 7/2001 | Chen et al. | 428/317.9 |

FOREIGN PATENT DOCUMENTS

| | | |
|---|---|---|
| JP | H4-283657 | 10/1992 |
| JP | H9-292824 | 11/1997 |

OTHER PUBLICATIONS

Sadayuki Takagi, Shuu–Kaku–No–Hanashi, Iwanami–Shoten, 1974, Japan.

* cited by examiner

Primary Examiner—Daryl Pope

(57) ABSTRACT

A highly reliable odor communication system which cannot be influenced by the natural condition and phenomenon and does not have a limit of the distance for sending odor signals. In the odor communication system, a data transmission system has an odor analysis unit for measuring humidity, temperature, mass, and odor constituents of an odor source and a data receiving unit has an odor emission unit for emitting an odor based on humidity, temperature, mass, and constituents of the odor, information of which is transmitted from the data transmission system. The odor emission unit has an odor element cell which has a nozzle for emitting an odor substance, an odor element cell layer having an odor element cell row in which one or more odor element cells are arranged in a horizontal direction and an odor element cell column in which one or more odor element cells are arranged in a vertical direction, an odor element selection mechanism for releasing the odor substance by selecting a desired odor element cell from one or more odor element cells of the odor element cell layer, and an odor element cell storage unit having layers in which one or more combination layers of one or more odor element cell layers and one or more odor element cell selection mechanisms are layered.

20 Claims, 26 Drawing Sheets

FIG. 41
| ID | ODOR ELEMENT | MASS (μg) | MASS RATIO | TEMP (°C) | HUMID (%) | GRAPH DATA |
|----|---|---|---|---|---|---|
| 1 | GERANIOL | 1.0 | 5 | 20 | 50 | 1 |
| 2 | VANILLIN | 0.2 | 1 | 20 | 50 | 1 |
| 3 | MENTHOL | 0.6 | 3 | 20 | 50 | 1 |
FIG. 42
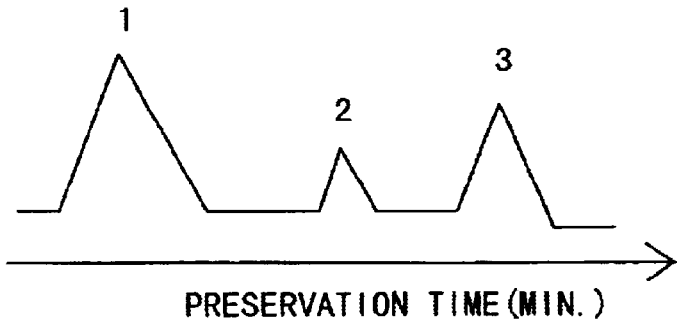
PRESERVATION TIME (MIN.)
FIG. 43
| ID | CLASS | ODOR ELM. | POS. X | POS. Y | POS. Z | START | VALID. | ROOT |
|----|---|---|---|---|---|---|---|---|
| 1 | ROSE | GERANIOL | 1 | 3 | 2 | 6/7/98 | 200 | A |
| 2 | VANILLA | VANILLIN | 2 | 2 | 1 | 7/4/98 | 250 | A |
| 3 | MINT | MENTHOL | 3 | 1 | 3 | 5/9/98 | 300 | B |
FIG. 44

ODOR COMMUNICATION SYSTEM IN MULTIMEDIA

TECHNICAL FIELD

This invention relates to an odor communication system in multimedia systems for receiving and/or sending an odor thorough a telecommunication line.

BACKGROUND ART

According to the publication entitled "Ko-Do" by Onmasa Sanjounishi ankou-sha, 1971, "Ko-Do," which had been originated in "Ko-Awase" which had been loved in the Hei-An period and developed to "Ko-do," has been practiced continuously until now from the era of Yoshimasa Ashikaga. By practicing the Ko-Do, practicing people can reduce stress, concentrate their attention on their mind, and then be motivated for their progressive lives. The Ko-do has been superior traditional culture in order to enable people to become happier and comfortable. Further, according to the publication entitled "Shuu-Kaku-No-Hanashi" by Sadayuki Takagi (Iwanami-Shoten, 1974), human beings breathe deeply and become healthy and good mind condition when human beings smell a good odor. Moreover, smelling the good odor functions as the sedative effect for bringing down the blood pressure, reducing excessive stress, and so forth. There are so many people who can live life to the fullest and become the supreme happiest mind condition by perceiving lover's smell.

It is capable of being found that the odor has the inscrutable power to all the creatures including human beings. There are so many kinds of odors in our living circumstances, and it has been done since the dawn of history to try to identify the kinds of odors. According to the idea expressing "A Sense and A Sensible Thing" by Aristotle, ΤΙΕΡΙ ΑΙΣΘΗΣΕΟΣ ΚΑΙ ΑΙΣΘ ΗΤΩΝ, BC348~334, in the Greek period, the odors were divided into seven classes such as sweet, sour, pungent, rich, fatty, astringent, and excreta. All the creatures including human beings communicate with identifying the odors. In the world of creatures, a special odor is secreted with having the special meaning to some creatures and is sent to the special group and other creatures. For example, an insect, such as a silkworm, having the extreme keen sense of smell communicates with each other in the distance of more than 10 kilometers by emitting a special odor (pheromone) from a gland in the thorax region.

U.S. Pat. No. 5,724,256 to Lee et al. discloses a computer controlled olfactory mixing and dispensing system for use in multimedia computer applications. U.S. Pat. No. 5,767,385 issued to Bundy et al. discloses an automated forced-choice dynamic-dilution olfactometer and the method of operating the same which is directed to an automatic forced-choice, dynamic-dilution olfactometer aimed at measuring odor concentration associated with air from and surrounding livestock buildings. It measures quantitatively how many times more concentrated the odor is than its threshold concentration. The measurement is made through an olfactometer and panelists. U.S. Pat. No. 5,675,070 to Gelperin discloses artificial olfactory systems that use gas sensor arrays to identify an object by the odor emitted by that object. U.S. Pat. No. 4,895,017 to Pyke et al. discloses a chemical vapor sensor and a method for sensing and identifying chemical vapors using a micro-computer. U.S. Pat. No. 5,177,994 discloses an odor sensing system in which an odor signal detected by a sensor is identified by a neural network. Japanese Patent Application Toku-kai-Hei 4-283657 to Kamejima discloses a gas chromatograph mass analysis apparatus using the gas chromatograph apparatus and the mass analysis apparatus.

Those systems, however, do not disclose odor communication systems. Japanese Patent Application Toku-kai-Hei 9-292824 to Sekiguchi and Sato discloses a similar odor producing medium as well as a similar odor producing method and apparatus for enabling a telecommunication receiver to experience the same or desired odor sense as a transmitter using encoded odor information. Further, it discloses a method and apparatus for producing an odor by selectively destroying a micro capsule coated on a disk by a laser beam being irradiated. However, it does not disclose the odor communication system based on a switching method and apparatus for selecting an desired odor element by employing the odor element cells and using an odor selection mechanism. Further, the conventional odor communication performed by all the creature including human beings has the problem in which there has been a limit of the distance for communicating to the object and the contents of communication have been influenced by the natural environment and phenomenon. The odor communication system, which has been capable of being relied, not been influenced by natural conditions and phenomena, and not had a limit of the distance for communication, has not existed.

Thus, the object of the present invention is to provide the highly reliable odor communication system which is not capable of being influenced by natural conditions and phenomena and does not have a limit of the distance for communication.

DISCLOSURE OF INVENTION

In a data transmitting and receiving system including a data transmitting unit and a data receiving unit, the data transmitting unit has an odor analysis unit for measuring mass and constituents of an odor of a source producing an odor and the data receiving unit has an odor emission unit for emitting the odor based on mass and constituents of the odor transmitted from the data transmitting system.

The odor analysis unit has an odor constituent separation unit for separating the odor constituents of the source producing the odor and a mass analysis unit for outputting a mass spectrum of the odor constituents.

The odor emission unit has an odor base (OB) including a plurality of odor element cells arranged in advance corresponding to each root odor classification of a plurality of odors and an odor base management system (OBMS) for managing the odor base in order to emit the predetermined odor based on graphic data indicating keeping time and peak value for indicating the strength of each odor element, humidity, temperature, mass and mass ratio, and each odor element of the source producing the odor transmitted from an odor communication system for the sending site.

The data receiving unit has a data base for storing an odor record containing information managing a plurality of odor element cells arranged in advance corresponding to each root odor classification of a plurality of odors and a data base management system for extracting the odor record corresponding to each odor element of the source producing the odor transmitted from the data transmitting system and outputting to the odor emission unit.

The odor record has information such as an identification number, an odor element cell validity date, a beginning date of an odor element cell, a horizontal direction position (X), a vertical direction position (Y), and a height position (Z) in order to designate the odor element cell of the odor emission unit.

The odor base management system selects the designated odor element cell from the odor base based on the OB management record containing emission volume control information for emitting the specified volume of the odor from the odor element cell and position information such as the horizontal direction position (X), the vertical direction position (Y), and the height position (Z) in order to designate the odor element cell and emits the odor.

The odor communication system has a compressed air ventilation unit for sending compressed air, a purifier for exchanging compressed air with purified compressed air, an odor element cell storage unit for outputting an odorous air containing the emitted odor in purified air by selecting the odor element cell according to an operation signal from the odor base management system, a mixer for mixing the odorous air output from the odor element cell storage unit, an odor analysis unit for outputting a constituent analysis result to the odor base management system by executing an odor constituent analysis of the odor mixed in the mixer, a valve for releasing or shutting off releasing the odor to an odor diffusion unit, a storing processing unit for storing the odor mixed in the mixer, and a deodorization processing unit for deodorizing the odor mixed in the mixer.

The mixer is formed with a round shape like a ball and has an odorous air inlet passage for odorous air output from the odor element cell storage unit to flow in, a fan for stirring odorous air, an odorous air outlet passage for the odor mixed in the mixer to flow out to the odor analysis unit, and the odorous air outlet passage for the odor mixed in the mixer to flow out.

An odor element cell storage unit has an odor element cell layer having an odor element cell row in which one or more odor element cells are arranged in the horizontal direction and an odor element cell column in which one or more odor element cells are arranged in the vertical direction and an odor element selection mechanism for releasing the odor substance by selecting the desired odor element cell from one or more odor element cells of the odor element cell layer and layers one or more combination layers of the odor element cell layers and the odor element cell selection mechanisms.

The odor element selection mechanism has each X-axis selection arm moving in the both directions and each Y-axis selection arm moving in the both directions, in which each odor passage through-hole is provided without any gap from each odor emitting nozzle installation position provided on each odor element cell of one or more odor element cells forming the odor element cell layer.

The odor element selection mechanism functions to emit the odor from the odor element cell when the odor substance passage holes, which are in an X-axis selection arm and a Y-axis selection arm, in a plurality of the odor substance passage holes provided in a plurality of X-axis selection arms and Y-axis selection arms are in the open condition and not to emit the odor from the odor element cell when the above explained odor substance passage holes are in the closed condition.

The odor element selection mechanism functions in order for the X-axis selection arm to move in the both directions of the X-axis and for the Y-axis selection arm to move in the both directions of the Y-axis.

The odor element cell layer is rotatable and the odor is emitted from the designated odor element cell of one or more odor element cells of the odor element cell layer by a nozzle pressure head moving in the horizontal directions (both directions) and the odor element cell layer rotating.

The odor element cell has a container for containing the odor substance, a body for containing odor gas with a gasified state in which an odor substance is compressed or mixed with deodorized compressed air in said container, a connector for engaging and connecting the odor element cell with the socket of a mounting plate, the first head for the odor substance to flow through an odor passage through-hole, and the second head to emit outside the odor substance which has flowed through the first head.

A connection portion, where the convex surface portion of the socket is engaged with concave surface portion formed around the plug or a male screw formed on the plug and a female screw formed inside surface of the socket are engaged with each other, is connected securely.

The odor element cell has odor contents such as a solid odor substance, a sublimation solid odor substance being mixed in the solid odor substance, and a porous solid odor substance in which the odor substance is absorbed and odorous air flows through a through-hole which is provided in the middle portion of the odor contents.

The odor base management system executes an odor diffusion procedure for producing and diffusing an odor from the odor base, an odor comparison procedure for comparing. and analyzing the odor produced and diffused, and an odor diffusion fine adjustment procedure for executing repeatedly the fine adjustment procedure for the odor diffusion until getting a predetermined result based on the result of the odor comparison procedure, and terminates the procedure for the odor base management after getting the predetermined comparison result.

The odor comparison procedure compares odor information such as humidity, temperature, mass, odor constituents sent from the data transmitting system with odor information such as humidity, temperature, mass, and odor constituents produced by the odor element cell storage unit being operated.

The odor comparison unit compares graph data indicating odor keeping time (minute) and peak value of an odor element sent from a data transmitting system with graph data indicating odor keeping time (minute) and peak value of an odor element obtained by the odor element cell storage unit being operated.

The odor comparison unit compares produced odor density with a predetermined value according to odor substance density based on relationship between sensitivity strength of a human being and impulsive strength caused by odor material density.

A recording media records a computer processing program for an odor diffusion procedure for producing and diffusing the odor, an odor comparison procedure for analyzing and comparing produced and diffused odors, and an odor diffusion fine adjustment procedure for repeating the odor diffusion fine adjustment processing until the designated comparison result is attained based on the results of the odor comparison procedure.

In accordance with the odor communication system composed as explained in the above being operated, the odor emission unit is capable of emitting the predetermined odor based on graphic data indicating odor keeping time and the peak value for indicating the strength of each odor element, humidity, temperature, mass and mass ratio, each odor element of the odor source, and so forth transmitted from the data transmitting system by the odor base management system (OBMS) being managing the odor base (OB) including a plurality of odor element cells arranged in advance corresponding to each root odor classification of a plurality of odors.

The odor base management system selects a specified odor element cell from the odor base in order to emit an odor based on an OB management record including emission value control information in order to emit specified value of an odor from the odor element cell and position information of the horizontal direction position (X), the vertical direction position (Y), and the height position (Z) in order to designate an odor element cell of the odor base.

In accordance with the signal the odor base management system outputs, the odor element selection mechanism functions in order for the X-axis selection arm to move in the both directions of the X-axis and for the Y-axis selection arm to move in the both directions of the Y-axis. The odor element selection mechanism functions to emit the odor from the odor element cell when the odor substance passage holes, which are in an X-axis selection arm and a Y-axis selection arm, in a plurality of the odor substance passage holes provided in a plurality of X-axis selection arms and Y-axis selection arms are in the open condition and not to emit the odor from the odor element cell when the above explained odor substance passage holes are in the closed condition.

The odor element cell layer of an odor emission unit is rotatable and odor is emitted from designated odor element cell of one or more odor element cells of the odor element cell layer by a nozzle pressure head moving in the horizontal directions (both directions) and the odor element cell layer rotating.

The odor base management system executes an odor diffusion procedure for producing and diffusing an odor from the odor base, an odor comparison procedure for comparing and analyzing the odor produced and diffused, and an odor diffusion fine adjustment procedure for executing repeatedly the fine adjustment procedure for the odor diffusion until getting a predetermined result based on the result of the odor comparison procedure, and terminates the procedure for the odor base management after getting the predetermined comparison result.

The odor comparison procedure compares odor information such as humidity, temperature, mass, odor constituents sent from the data transmitting system with odor information such as humidity, temperature, mass, and odor constituents produced by the odor element cell storage unit being operated.

The odor comparison unit compares graph data indicating odor keeping time (minute) and peak value of an odor element sent from a data transmitting system with graph data indicating odor keeping time (minute) and peak value of an odor element obtained by the odor element cell storage unit being operated. Further, the odor comparison unit compares produced odor density with a predetermined value according to odor substance density based on relationship between sensitivity strength of a human being and impulsive strength caused by odor material density.

Elastic material for pressuring the first head toward plug direction is set between bottom of the first head and bottom of the odor element cell, the first head and the plug are agreed completely by the elastic material and compressed air pressure in inner space, the odor inside the odor element cell does not leak outside, space is provided inside the first head, a plurality of odor passage through-holes are provided near in a bottom of the first head, and inner space of the first head is connected to inner space of the odor element cell, the odor contained in the odor element cell is released in the inner space of the first head through a plurality of the odor passage through-holes.

Odor contents contained in the odor element cell are any types such as an odor substance solid, an odor sublimation substance mixing with an odorous constituent, and an odor porous solid absorbing an odor constituent and a through-hole is provided in the middle portion of the odor contents, air flows in the thorough-hole, and odorous air is produced.

The odor communication system has an alarming unit for informing harmful situation by displaying on a screen and outputting an alarm signal and sound in order not to release the odor by closing a valve by comparing with harmful odor constituent information installed beforehand when produced air is harmful to creatures and dangerous to circumstances and an unit for opening the valve and informing normal situation to a user by displaying odor information such as a constituent, an odor element classification, a category, and other odor information on the screen with releasing the produced odor when produced air is not harmful to creatures and not dangerous to circumstances.

The odor communication system has a determination unit for determining whether or not the volume (B) of the odor which is apart of the volume (A) of the odor produced in OB should be output and the excess volume (A-B) of the odor should be stored, a storing unit for storing the excess volume of the odor in OB according to the necessity by executing a storing process if the storing process is required, and a deodorizing unit for deodorizing the odor if the storing process is not required.

The odor communication system has a temporary storage unit for temporarily storing an odor emitted from the odor element cell selected from the odor element cell storage unit in an arbitrary one temporal odor storage container according to the necessity, a unit for sending an odor stored in each temporal odor storage container to a mixer installed in a temperature control container by a pump for controlling and adjusting odor mixture condition, an analysis unit for analyzing an odor mixed in a process in which an odor is mixed in the mixer by sending a mixed odor to an odor analysis unit, and an emitting unit for emitting an odor from the mixer when a desired odor is mixed and produced in the mixer.

The odor record includes odor sense threshold value (ppm) of odor density in which a human being is capable of sensing an odor, gas chromatograph threshold value (ppm) of odor density in which chromatograph is capable of sensing an odor, odor recognition threshold value (ppm) of odor density in which the human being is capable of recognizing an odor, and so forth and the database management system includes a unit for modifying the odor record when a new odor element cell is added and installed in an odor element cell storage unit and a unit for deciding the most effective odor density based on relationship between the sensitivity strength of the human being and the density of odor material.

A recording medium in which a computer processing program is recorded includes an odor base operation record for recording position information of a horizontal direction (X), a vertical direction (Y), and a height direction (Z) in order to indicate an odor element cell of an odor base and releasing volume control information in order to release the volume of specified odor from the odor element cell, an odor record for recording information of a horizontal direction (X), a vertical direction (Y), and a height direction (Z) in order to indicate an. odor element cell of an odor base, an odor element, a beginning date of the odor element cell, an odor element cell validity date, an identification number, odor sense threshold value (ppm) of odor density in which a human being is capable of sensing the odor, gas chromatograph threshold value (ppm) of odor density in which gas chromatograph is capable of sensing the odor, odor recognition threshold value (ppm) of odor density in which the human being is capable of recognizing the odor, an odor base management program for managing OB in order to emit a specified odor based on graph data for indicating each odor element, mass, mass ratio, temperature, humid, peak value indicating strength of each odor element, and odor keeping time for each odor element, and a computer program for executing a procedure of deciding most effective odor density based on relationship between sensitivity strength of the human being and density of odor material.

BRIEF DESCRIPTION OF DRAWINGS

FIG. 41 shows contents of data transmitted from the odor communication system for a sending site.

FIG. 42 is a graph in which the graphic data obtained from the gas chromatograph corresponds to each ID.

FIG. 43 is an odor record stored in DB.

FIG. 44 is an OB management record containing OB management information.

BEST MODE FOR CARRYING OUT THE INVENTION

Figure 1:
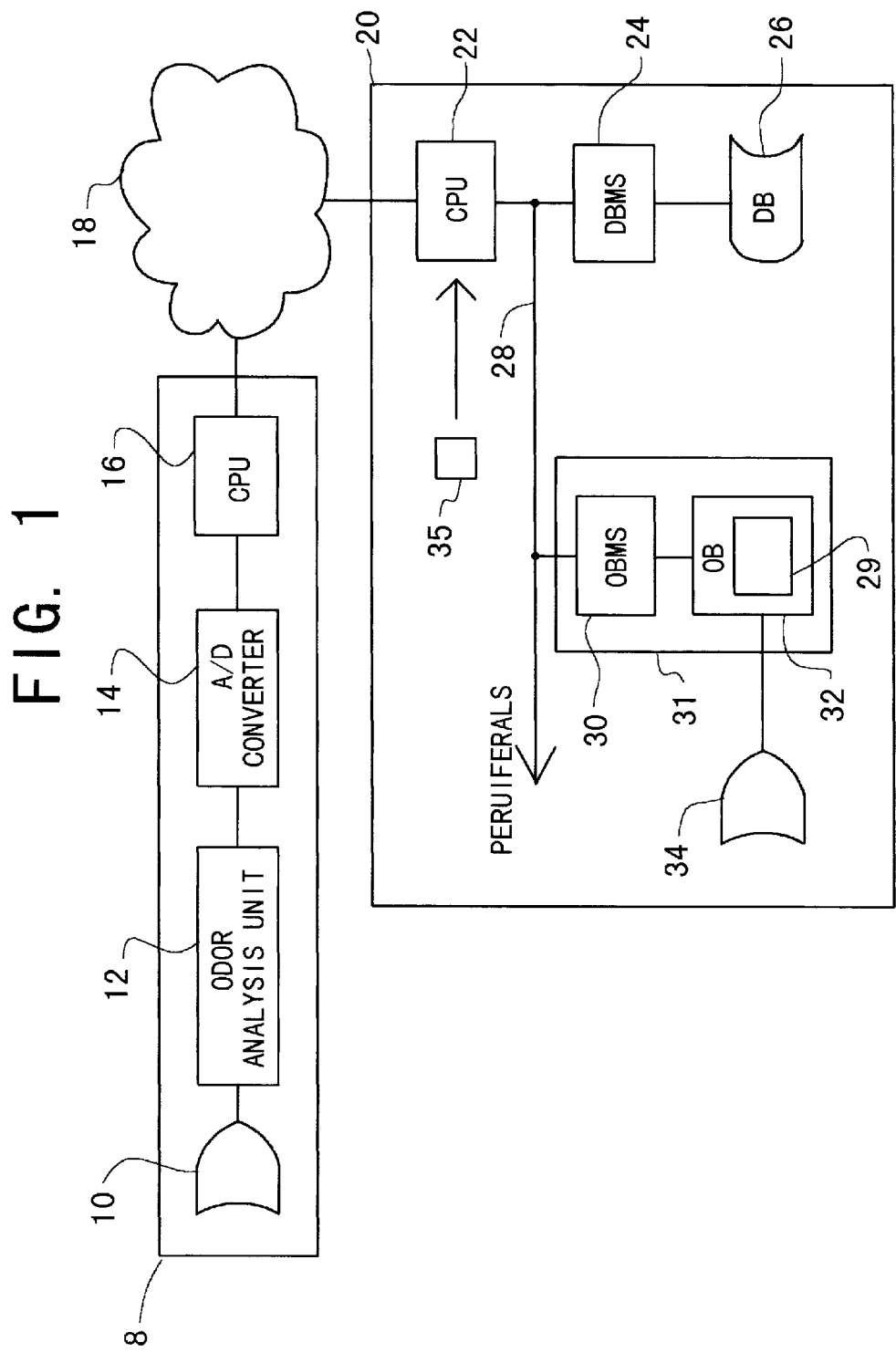
FIG. 1 is a general block diagram of a system for showing a general system concept of an odor communication system of the present invention.

FIG. 1 is a general block diagram of a system for showing a general system concept of an odor communication system of the present invention. The odor communication system 8 for the sending site has an odor capture case 10, an odor analysis unit 12, an A/D converter 14, and CPU 16. The odor capture case 10 of the odor communication system 8 for the sending site captures the odor from an odor emitting source. Captured odors are analyzed by the odor analysis unit 12 including a gas chromatograph, an infrared spectrograph, a mass spectrograph, and so forth, then odor information such as odor elements, mass, temperature, humidity, and so forth, is output. Odor information is converted to a digital signal by an A/D converter 14, and then input to CPU (Central Processing Unit) 16. CPU 16 is connected to the Internet 18, thus odor information is capable of being transmitted to the receiving site. Here, although the Internet 18 is used as the connection line between the sending site and the receiving site, any kinds of telecommunication connecting methods such as other types of online telecommunication networks and wire connection by a conductor are capable of being used. An odor receiving unit 20 for the receiving site includes CPU 22, DBMS (Data Base Management System) 24, DB (Data Base) 26, a connection wire 28, an odor emission unit 31, an odor diffusion unit 34, and a recording media 35. The odor emission unit 31 includes OBMS (Odor Base Management System) 30 as the odor base management system and OB (Odor Base) 32 as the odor base. An odor element cell storage unit 29 is an element unit of the OB 32. The odor receiving unit 20 receives odor information transmitted from the odor communication system 8 for the sending site. If odor information is received successfully, a normal information acceptance message and a completion message for odor information being received are transmitted to the odor communication system 8 for the sending site. If odor information is not received successfully, an abnormal information acceptance message and a request message for odor information to be transmitted again are transmitted to the odor communication system 8 for the sending site. CPU 22 sends received odor information into DBMS 24. DBMS 24 operates DB 26 in which an odor element record has been stored based on odor information. CPU 22, DBMS 24, and OBMS 30 are connected by the connection wire 28. OBMS 30 operates OB 32 based on the odor element records extracted and operated by DBMS 24. OBMS 32 generates the odor based on the odor element record and diffuses the odor from the odor diffusion unit 34 by OBMS 30 being operating OB 32. The recording media 35 records an executing program for generating the odor. The connection wire 28 further connects a display unit, a printer, and other peripheral units.

Figure 2:
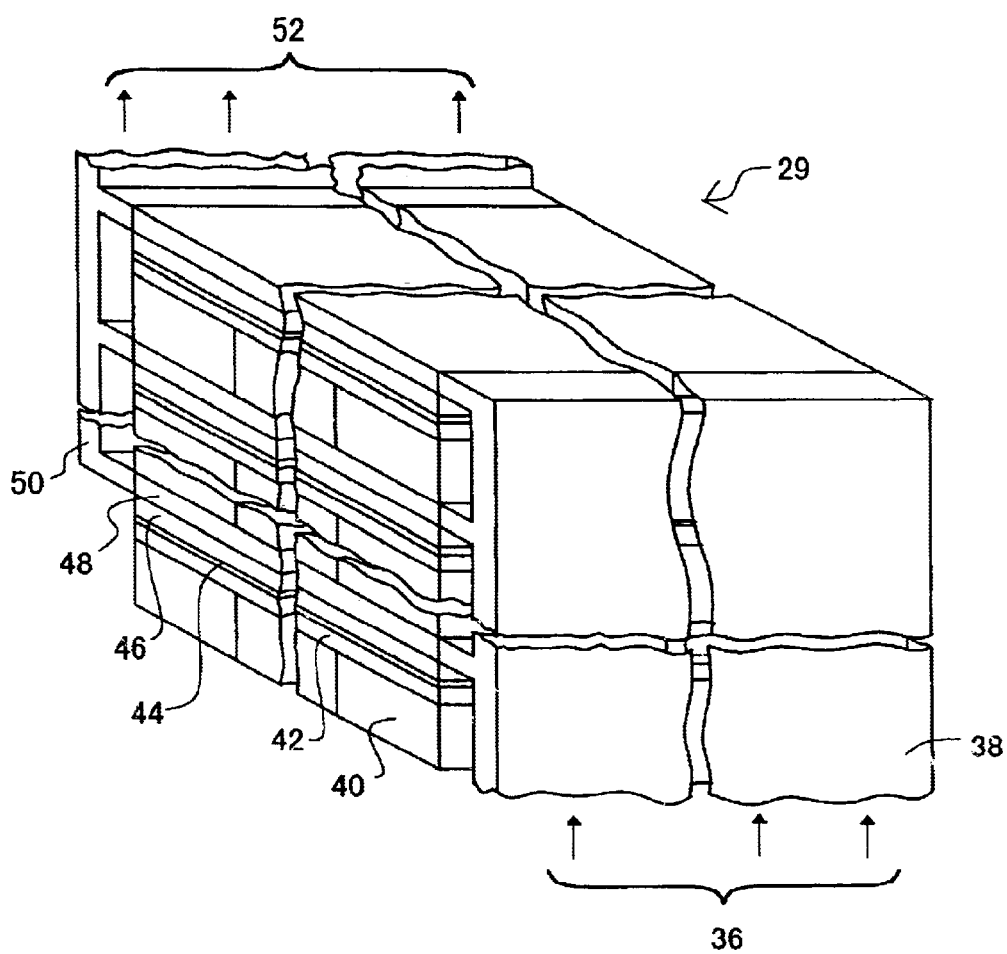
FIG. 2 is a general view showing the first preferred embodiment of the odor element cell storage unit.

FIG. 2 is a general view showing the first preferred embodiment of the odor element cell storage unit 29 included in OB 32 of the odor emission unit 31. The odor element cell storage unit 29 includes an odor element cell having a nozzle for releasing an odor substance, an odor cell layer including an odor element cell column in which one or more odor element cells are arranged in the vertical direction and an odor element row in which one or more odor element cells are arranged in the horizontal direction, an odor element cell selection mechanism for releasing the odor substance by selecting an odor element cell of one or more odor element cells included in the odor element cell layer, and one or more odor element cell layers in which a combination of odor element cell and the odor element cell selection mechanism is layered in a piling way. Deodorized air 36 is blown into an input air duct 38. The odor element cell storage unit 29 arranges a plurality of odor element cells 40. A mounting frame 42 is mounted on the upper portion of the arranged odor element cells 40, and each of the odor element cells 40 is arranged. The mounting frame 42 is mounted under a mounting plate 44 located in the upper portion. An odor element selection mechanism 46 is installed in the upper portion of the mounting plate 44. An air path 48 is provided in the upper portion of the mounting plate 44. Both ends of the air path 48 are opened, one open end of the air path 48 is connected with an input air path 38, and the other open end of the air path 48 is connected with the output air path 50. The deodorant air 36 passes through the input air path 38 and then carries the odor drifting in the air path 48 emitted from the odor element cell 40 in the output air path 50 by being selected by the odor element selection mechanism 46, thus an output odor 52 is output from the open end of the output air path 50. The odor passage such as the air inlet passage 38, the air path 48, and the output air path 50 is made of material which is not capable of adhering the odor substances. The odor element cell storage unit 29 includes a plurality of odor element cells 40, the mounting frames 42, the mounting plates 44, the odor element selection mechanism 46, and one or more layers in which each of layers has the arranged odor element cells and the air path 48.

Figure 3:
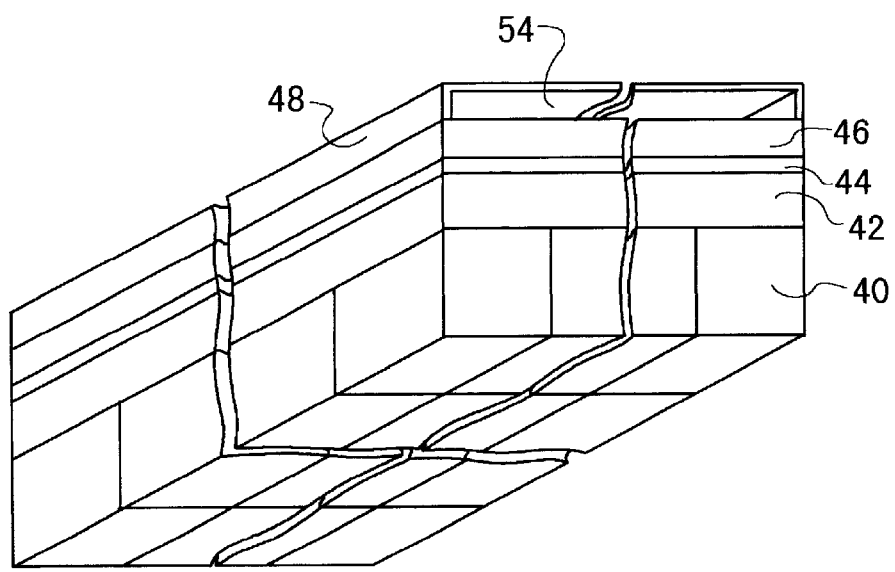
FIG. 3 is an enlarged view showing one layer of the odor element cell layers shown in FIG. 2.

FIG. 3 is an enlarged view showing one layer of the odor element cell layers shown in FIG. 2. The inside passage of the air path 48 is empty 54 as shown in the figure and both ends of the air path 48 are open.

Figure 4:
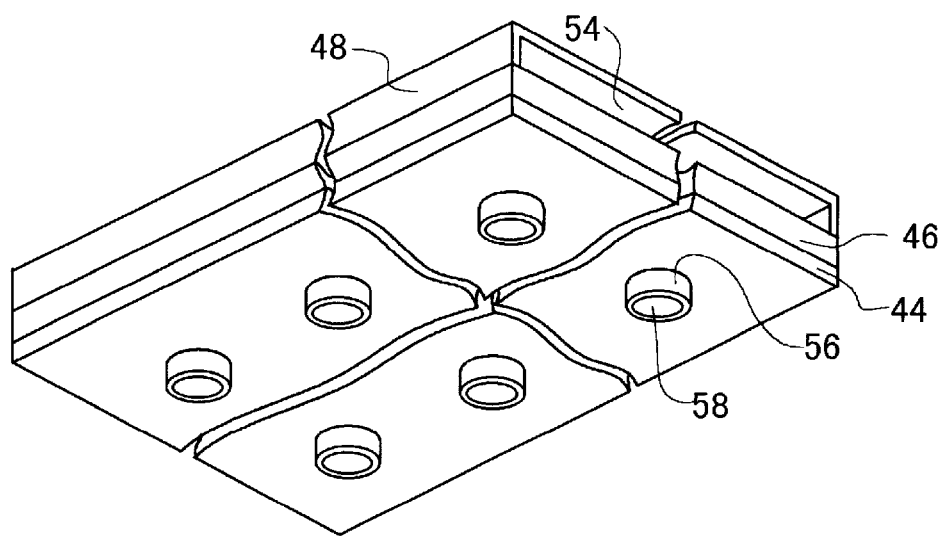
FIG. 4 is a general view showing one layer of the odor element cell layers in which the mounting frame and a plurality of odor element cells are removed.

FIG. 4 is a general view showing one layer of the odor element cell layers in which the mounting frame 42 and a plurality of odor element cells 40 are removed. The mounting plate 44 provides a plurality of sockets 56 in which the inside of the socket 56 is empty 58 to be fit to each of a plurality of the odor element cells 40.

Figure 5:
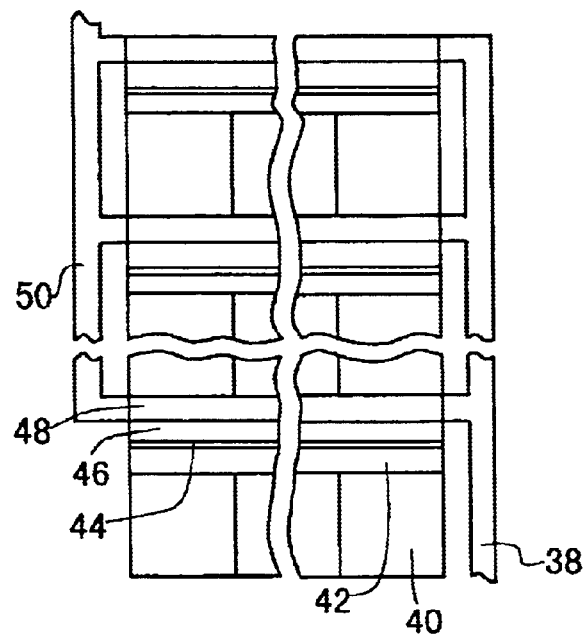
FIG. 5 is a front view showing the odor element cell storage unit shown in FIG. 2.
Figure 6:
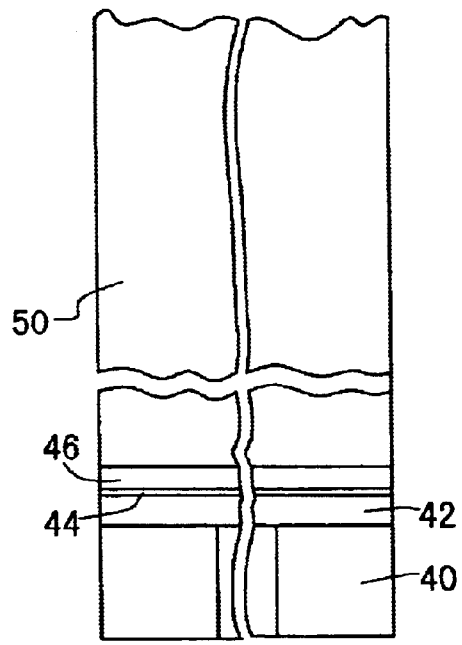
FIG. 6 is a left side view showing the odor element cell storage unit shown in FIG. 2.
Figure 7:
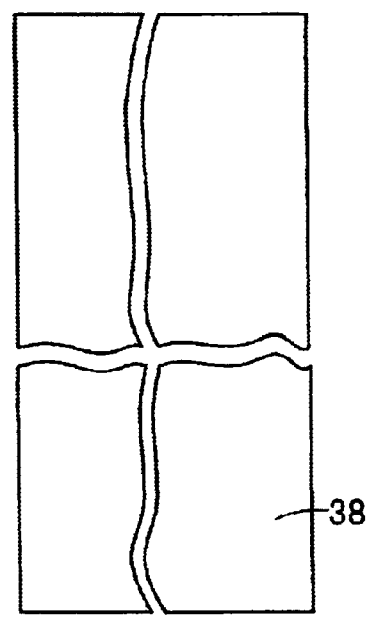
FIG. 7 is a right side view showing the odor element cell storage unit shown in FIG. 2.

FIG. 5 is a front view showing the odor element cell storage unit 29 shown in FIG. 2. FIG. 6 is a left side view showing the odor element cell storage unit 29 shown in FIG. 2. FIG. 7 is a right side view showing the odor element cell storage unit 29 shown in FIG. 2.

Figures 8, 9:
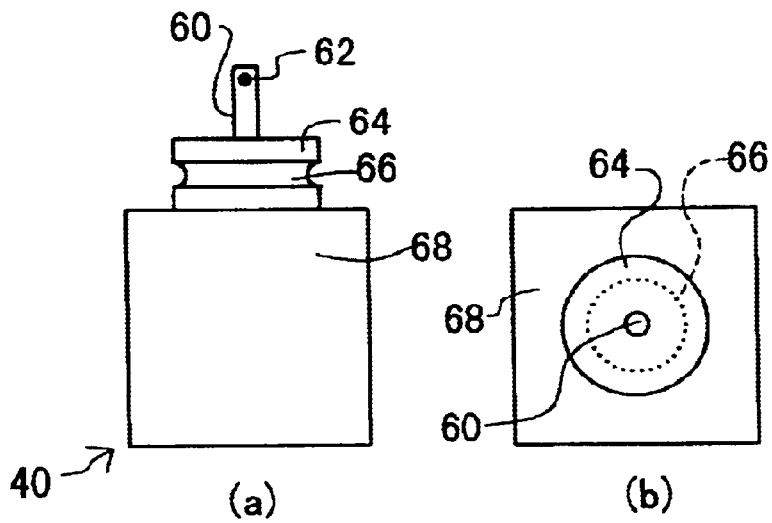
FIG. 8 is a front view showing the odor element cell.
FIG. 9 is a top view of the odor element cell.

FIG. 8 is a front view showing the odor element cell. FIG. 9 is a top view of the odor element cell. The odor element cell 40 includes a container 68 for containing the odor substance, a plug 64, and an odor emitting nozzle 60. The odor substance is contained in the container 68 by being compressed or mixed with a deodorant compressed gas. The plug 64 provides a hollow 66 around the plug 64 as shown in the figure. A hole 62 for releasing the odor substance contained in the container 68 when the odor emitting nozzle 60 is pressed toward the container 68 is provided. Although the shape of the container 68 containing the odor substance is a cube in the same figures, it is capable of being a cylinder. Further, it is capable of being an oval or other arbitrary forms.

Figures 10, 11:
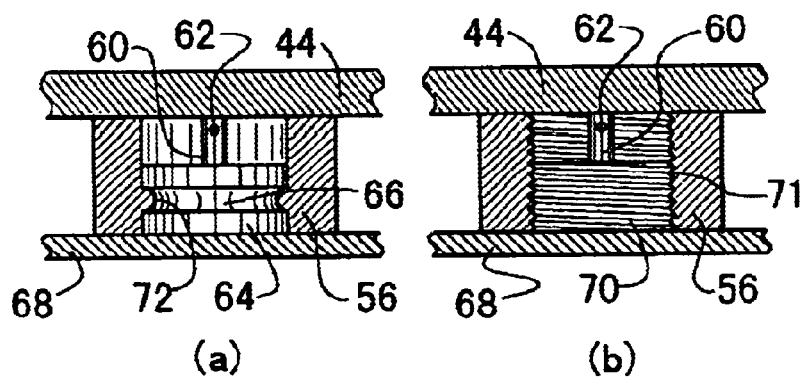
FIG. 10 is an explanatory view for showing a connection condition in which the plug is put in the socket.
FIG. 11 is an explanatory view for showing a connection condition in which a male screw formed on the plug and a female screw formed inside surface of the socket are engaged with each other.

FIG. 10 is an explanatory view for showing a connection condition in which the plug 64 is put in the socket 56. The convex surface portion 72 of the socket 56 is engaged with concave surface portion 66 formed around the plug 64, then the plug 64 and the socket 56 are engaged securely. FIG. 11 is an explanatory view for showing a connection condition in which a male screw 70 formed on the plug 64 and a female screw formed inside surface of the socket 56 are engaged with each other.

Figure 12:
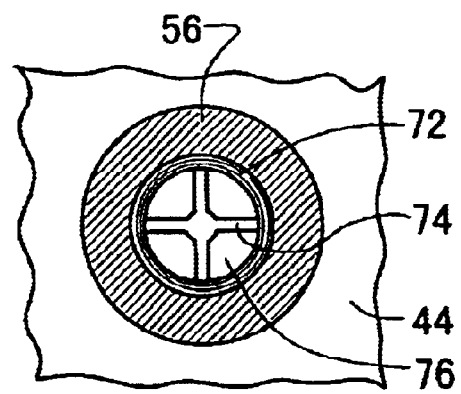
FIG. 12 is an explanatory view showing the socket viewed toward the mounting plate.

FIG. 12 is an explanatory view showing the socket 56 viewed toward the mounting plate 44. A nozzle fix plate 74 including plurality of openings 76 is provided inside the socket 56. When the plug 64 of the odor element cell 40 has been engaged with the socket 56, the odor emitting nozzle 60 is pressured toward the container 68, the odor substance contained in the container 68 is jetted, and then the jetted odor substance passes through a plurality of openings 76.

Figure 13:
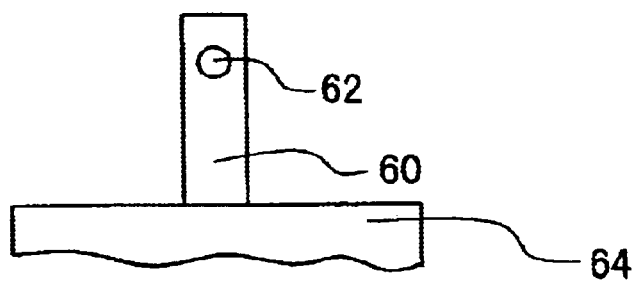
FIG. 13 is an explanatory view showing the odor element cell before being engaged and connected.

FIG. 13 is an explanatory view showing the odor element cell before being engaged and connected. Before the plug 64 is engaged and connected, the length of the odor emitting nozzle 60 remains the same. Thus, the odor from the hole 62 provided in the odor emitting nozzle 60 should not be jetted.

Figure 14:
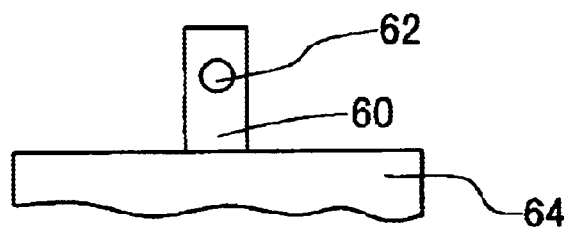
FIG. 14 is an explanatory view showing the odor element cell after engaged and connected.

FIG. 14 is an explanatory view showing the odor element cell after engaged and connected. After the plug 64 has been engaged and connected, the odor emitting nozzle 60 is pressured toward the container 68 by the nozzle fix plate 74.

Figure 15:
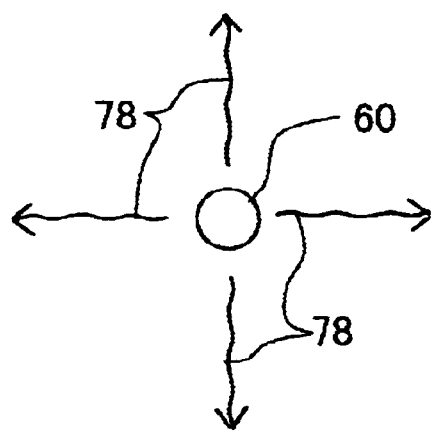
FIG. 15 is an explanatory view showing odor emitting directions jetted from the nozzle after element cell has been engaged and connected.

FIG. 15 is an explanatory view showing odor emitting directions jetted from the nozzle after element cell has been engaged and connected. As shown by wave lines, odor substance 78 contained in the container 68 is jetted from the hole 62 of the odor emitting nozzle 60.

Figure 16:
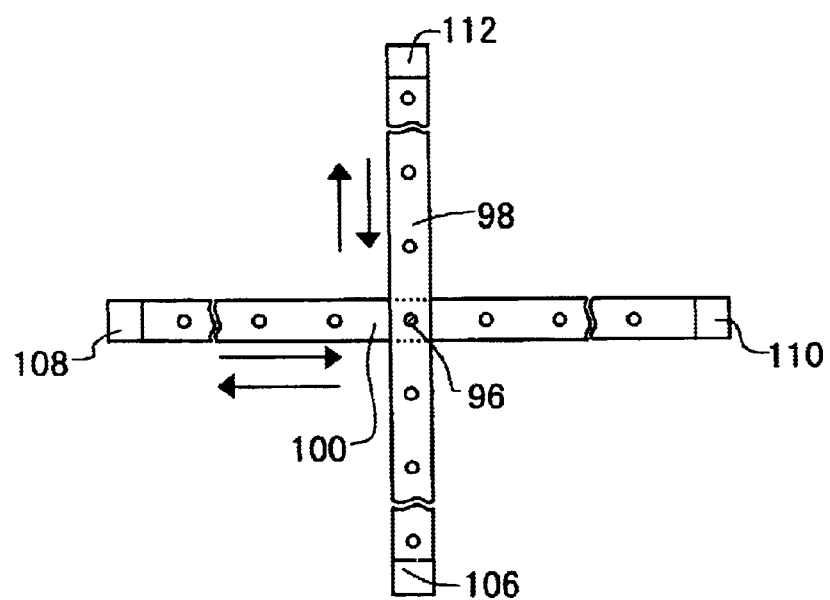
FIG. 16 is an explanatory view showing cross relation of a selection arm group in the first preferred embodiment of an odor element selection mechanism.
Figure 17:
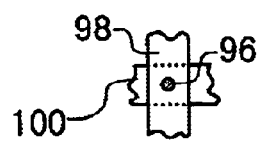
FIG. 17 is an explanatory view showing an odor substance passage hole in which air flows since each hole crosses in the same hole position and the hole has become an air flowing condition (ON).

FIG. 16 is an explanatory view showing cross relation of a selection arm group in the first preferred embodiment of the odor element selection mechanism 46. The selection arm group includes a plurality of X-axis (horizontal direction) selection arms 100 and a plurality of Y-axis (vertical direction) selection arms 98. Each hole of each of the X-axis selection arms 100 and each of the Y-axis selection arms 98 correspond to each of the openings 76 of a plurality of the sockets 56, thus odor air flow is capable of being switched like flowing (ON) and not flowing (OFF). FIG. 16 cross relation between arbitrary one arm among a plurality of the X-axis (horizontal direction) selection arms 100 and arbitrary one arm among the Y-axis (vertical direction) selection arms 98. An arm movement mechanism 108 on one end of each of the X-axis selection arms 100 is installed, thus the X-axis selection arm 100 is capable of being moved in the arrow direction according to the input OB operation signal. Further, a restoration mechanism 110 is installed on the other end of each X-axis selection arm 100, thus moved X-axis selection arm 100 is moved back according to an input OB operation signal. In the same way, an arm movement mechanism 112 is installed on one end of each Y-axis selection arm 98, thus the Y-axis selection arm 98 is capable of being moved in the arrow direction according to the input OB operation signal. Further, the restoration mechanism 106 is installed on the other end of each Y-axis selection arm 98, thus moved Y-axis selection arm 98 is moved back according to an input OB operation signal. FIG. 17 is an explanatory view showing an odor substance passage hole 96 in which air flows since each hole crosses in the same hole position and the hole has become an air flowing condition (ON). Since one of a plurality of X-axis (horizontal direction) selection arms 100 and one of a plurality of Y-axis (vertical direction) selection arms 98 cross with each other in the same hole position, the odor substance passage hole 96 becomes the air flowing condition (ON).

Figure 18:
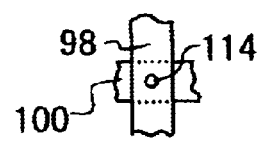
FIG. 18 is an explanatory view showing a hole in which an air is not capable of flowing (OFF) since each hole crosses in the different position.

FIG. 18 is an explanatory view showing a hole 114 in which an air is not capable of flowing (OFF) since each hole crosses in the different position. Since one of a plurality of X-axis (horizontal direction) selection arms 100 and one of a plurality of Y-axis (vertical direction) selection arms 98 cross in the different position, the hole 114 becomes the condition in which air is not capable of flowing (OFF). It is not necessary to install the restoration mechanisms 106 and 110 if the arm movement mechanisms 108 and 112 are capable of performing enough movement and restoration function in the arrow direction.

Figure 19:
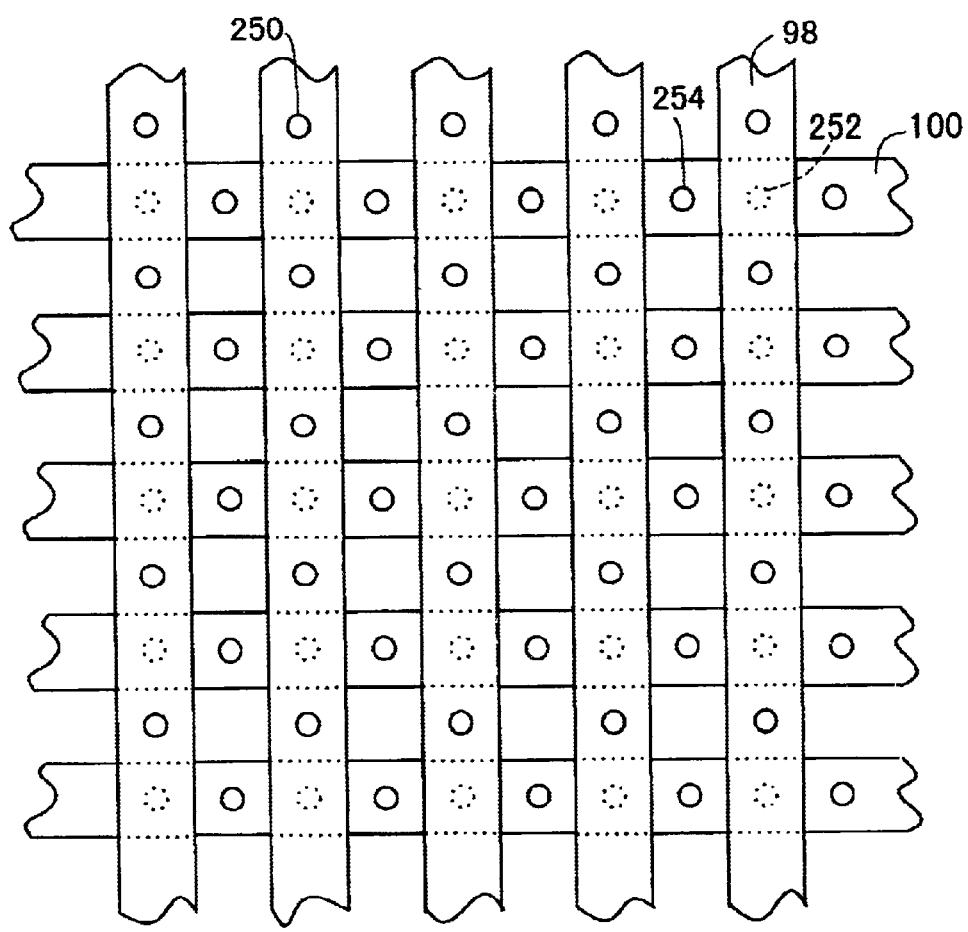
FIG. 19 is an explanatory view showing in detail each hole of a plurality of X-axis (horizontal direction) selection arms and a plurality of Y-axis (vertical direction) selection arms.

FIG. 19 is an explanatory view showing in detail each hole of a plurality of Y-axis (vertical direction) selection arms and a plurality of X-axis (horizontal direction) selection arms. Each hole 254 of a plurality of the X-axis (horizontal direction) selection arms 100 does not cross successfully with any each hole 250 of a plurality of the Y-axis (vertical direction) selection arms 98. Further, each hole of a plurality of the X-axis selection arms 100 and a plurality of the Y-axis selection arms 98 does not cross successfully with each hole 252 of a plurality of the sockets 56.

Figure 20:
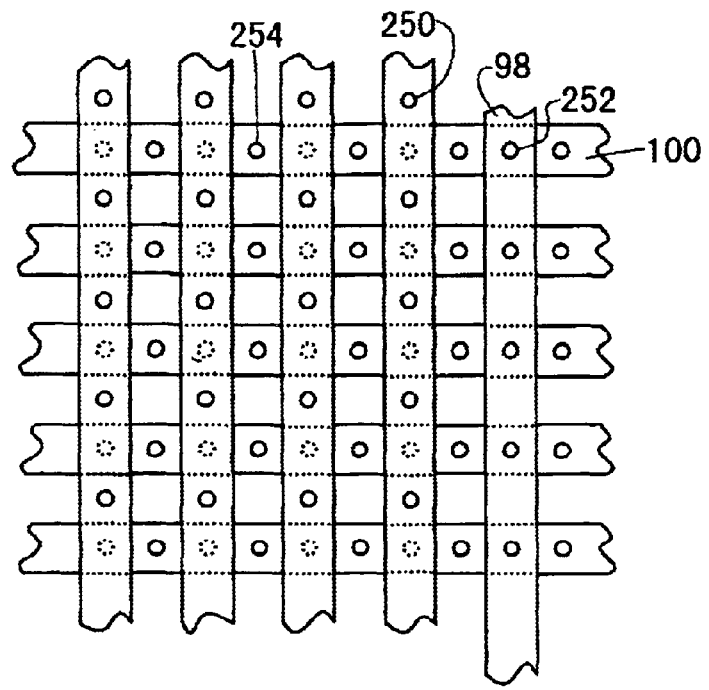
FIG. 20 is an explanatory view showing an arm condition in which the Y-axis (vertical direction) selection arm is only selected and moved.

FIG. 20 is an explanatory view showing an arm condition in which the Y-axis (vertical direction) selection arm is only selected and moved. Since only one arm is selected and moved from a plurality of Y-axis selection arms, selected Y-axis selection arm moves in order to locate the same hole position as the hole 252 position of a plurality of the sockets 56 located in the lower position of the arms.

Figure 21:
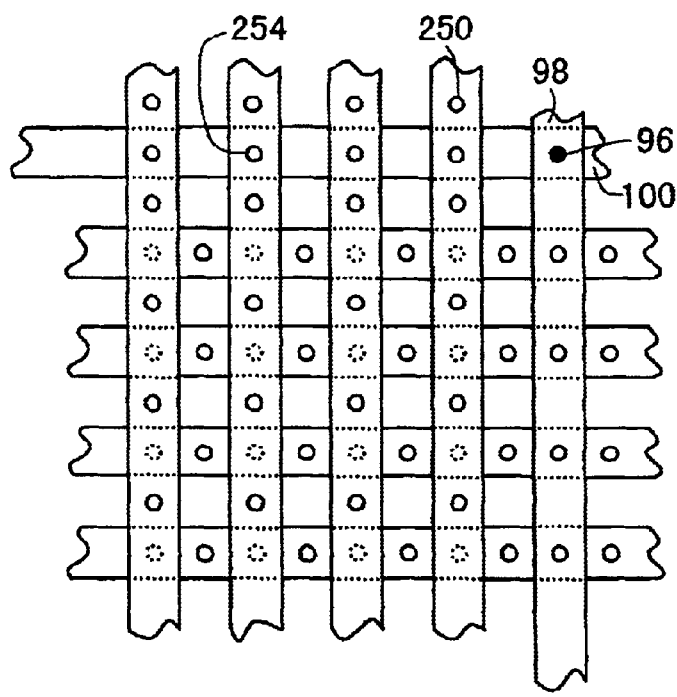
FIG. 21 is an explanatory view showing an arm condition in which one arm of a plurality of the X-axis (horizontal direction) selection arms of FIG. 20 is only selected and moved.

FIG. 21 is an explanatory view showing an arm condition in which one arm of a plurality of the X-axis (horizontal direction) selection arms of FIG. 20 is only selected and moved. Since one arm of a plurality of the X-axis selection arms is selected and moved, the selected X-axis selection arm moves in order to locate the position in which one hole 252 among a plurality of the sockets 56 locating in the lower position is selected. Therefore, one of the X-axis selection arms and one of the Y-axis selection arms are selected and moved, one hole of the X-axis selection arm and one hole of the Y-axis selection arm cross with each other, one hole 252 among a plurality of sockets 56 locating in the lower position is capable of being selected, thus the odor substance passage hole 96 for emitting the odor from the odor element cell 40 is made (ON).

Figure 22:
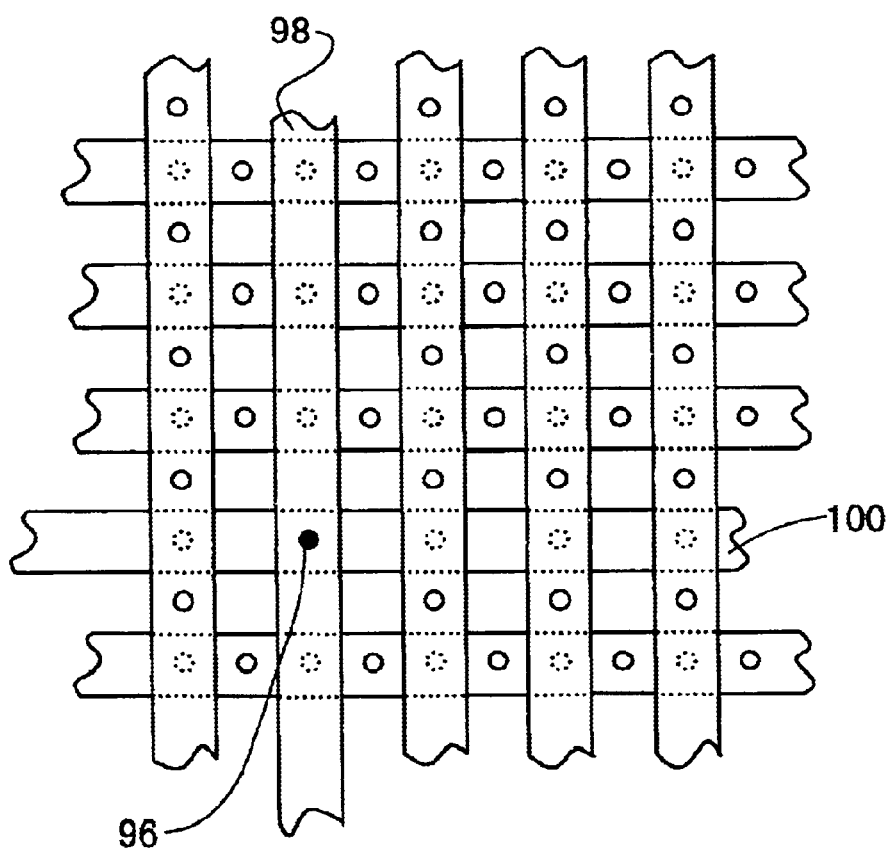
FIG. 22 is an explanatory view showing an arm condition in which each one arm of a plurality of the X and Y-axes selection arms of FIG. 19 is selected and moved.

FIG. 22 is an explanatory view showing an arm condition in which each one arm of a plurality of the X and Y-axes selection arms of FIG. 19 is selected and moved. In the same way as shown in FIGS. 19 to 21, each one arm of a plurality of the X and Y axes (vertical direction) selection arms is selected and moved, thus the hole 96 for emitting the odor from the odor element cell 40 is capable of being made (ON).

Figure 23:
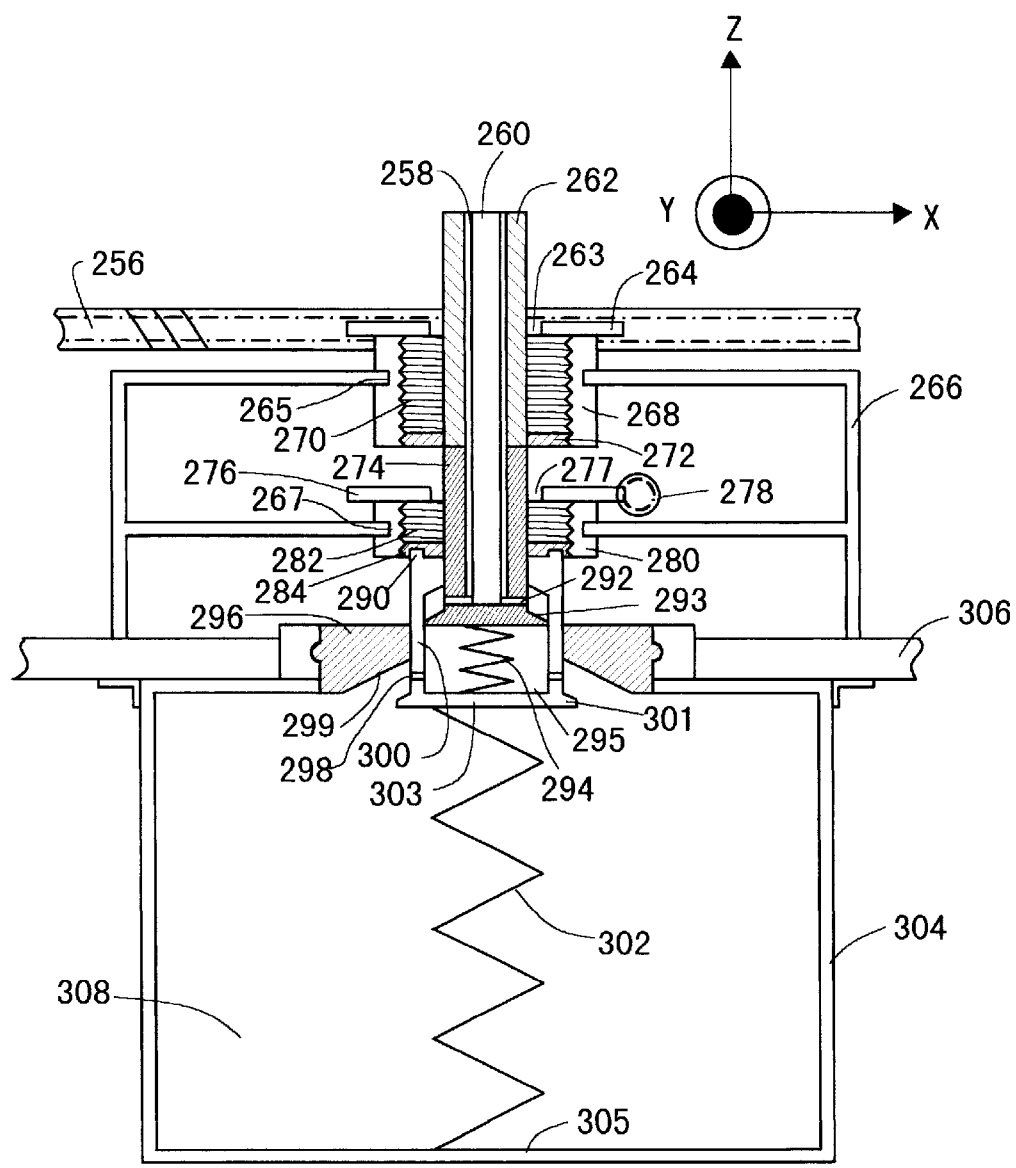
FIG. 23 is the second preferred embodiment of the odor element cell and the selection mechanism.

FIG. 23 is the second preferred embodiment of the odor element cell and the selection mechanism. An odor element cell 304 includes a plug 296. The purpose of installing a mounting plate 306 is to mount an odor element cell 304 in the same way as the mounting plate 44 as already explained. Here, among the X and Y axes selection arms which are already explained using FIG. 16, the X-axis (horizontal direction) selection arm 100 corresponds to a spiral gear 256 in the X-axis in the figure, and the Y-axis (vertical direction) selection arm 98 corresponds to a spiral gear 278 in the Y-axis in this figure. Further, the hole of the X-axis (horizontal direction) selection arm 100 corresponds to an odor passage through-hole 292 in this figure, and the hole of the Y-axis (vertical direction) selection arm 98 corresponds to an odor passage through-hole 298 in the figure. A hole, the size of which should not make any gap for causing an air leak, etc. between the plug 296 and the first head 300 and in which the first head 300 moves in the upward and downward directions, is provided. Although the shape of the first head 300 sliding and contacting with the center hole of the plug 296 is cylindrical form in the preferred embodiment, other shapes such as quadrilateral form and other polygon forms are capable of being used. In the lower part of the first head 300 located in the inner space 308 of the odor element cell 304, an inclination rim 301, the height of which becomes lower from the first head 300 to the outer potion of the first head 300 as shown in the figure, is constantly provided around the first head 300. Further, the angle and shape of a contact portion 299 of the plug 296 contacting with the inclination edge of the first head 300 are the same angle and shape as the inclination rim 301 of the first head 300. A spring 302 is installed as shown in the figure, between a bottom 305 of the odor element cell 304 and a bottom 303 of the first head 300. The spring 302 presses the first head 300 in the direction towards the plug 296. Therefore, since they perfectly contact with each other by the spring 302 and the compressed odorous air pressure of the inner space 308 in such a condition that they contact with each other in the contact portion 299, in other words, closed condition, the odor does not leak outside. As shown in the figure, space 295 is provided inside the first head 300. A plurality of odor passage through-holes 298 are provided near the lower part of the first head 300, and the inner space 295 of the first head 300 connects to the inner space 308 of the odor element cell 304. The odor gas enclosed in the odor element cell 304 is released in the inside space of the first head 300 through a plurality of the odor passage through-holes 298. A plurality of projections 290 are provided around the upper part of the first head 300 of the odor element cell 304, thus uneven structure of the convex and concave surface is formed in the upper part of the first head 300 of the odor element cell 304. A plurality of projections 290 are set in a plurality of the depressions of the uneven structured surface formed on the one side of a disc guide 284. A male screw is formed in the outside circumference of the disc guide 284, and it engages with a female screw 282 formed in the inside surface of a rotary cylinder 280. A spiral wheel gear 276 that engages with a spiral gear 278 is installed in the upper part of the rotary cylinder 280. A hole 277 the size of which is wide enough for the second head 274 not to contact with the spiral wheel gear 276 even if the spiral gear 278 in the Y-axis direction rotates is installed in the center portion of the spiral wheel gear 276. A depression 267 is provided around the surface of the rotary cylinder 280 in order for the rotary cylinder 280 to well rotate stably without any friction when a supporter 266 is set in the depression 267. Therefore, the disc guide 284 moves upward and downward without rotating according to the rotary direction of the rotary cylinder 280. FIG. 23 illustrates a sectional view showing the odor element cell in which a plurality of the odor passage through-holes 298 of the first head 300 are opened (ON). Here, a heater, which is controlled by an electrical signal, is installed around the cell body of the odor element cell 304 in order for the odor from the odor element cell 304 to emit effectively by heating the cell body according to the necessity, although it is not shown in the figure. For example, when a quantity of the odors contained in the odor element cell 304 becomes low, the odor is capable of being emitted effectively by thermally expanding the odors by the cell body being heated by the electrical signal for the heater being controlled.

A hole is provided in the center portion of the upper part of the first head 300 of the odor element cell 304 in order for the second head 274 to move smoothly in the upward and downward directions without any space between the first head 300 and the second head 274. A pipe 258 is installed in the center of the second head 274 in the longitudinal direction. The odor emitted in the inner space 295 of the first head 300 passes though a plurality of the odor passage through-holes 292 and an inner passage 260 of the pipe 258, and then it is emitted outside the odor element cell 304 finally. Here, in the same way as the case of the first head 300, although the shapes of the second head 274 and the pipe 258 are cylindrical forms in the preferred embodiment, other shapes such as quadrilateral form and other polygon forms are capable of being used. In the lower part of the second head 274 located in the inner space 295 of the first head 300, an inclination rim 293, the height of which becomes lower from the second head 274 to the outer potion of the second head 274 as shown in the figure, is constantly provided around the second head 274. A spring 294 is installed, as shown in the figure, between the bottom of the inner space 295 of the first head 300 and the bottom of the second head 274. A support side plate 262 projecting from the second head 274 is provided on the surface of the pipe 258 in the longitudinal direction. The support side plate 262 smoothly moves in the upward and downward (Z-axis) directions in the center portion of a disc guide 272, but it functions in order not to rotate the disc guide 272. A male screw is made in the outside circumference of the disc guide 272 and engages with a female screw 270 made in the inside surface of a rotary cylinder 268. A spiral wheel gear 264 that engages with a spiral gear 256 in the X-axis is installed in the upper part of the rotary cylinder 268. A hole 263 the size of which is wide enough for the pipe 258 and the support side plate 262 not to contact with spiral wheel gear 264 even if the spiral gear 256 rotates is installed in the center portion of spiral wheel gear 264. A depression 265 is provided around the surface of the rotary cylinder 268 in order for the rotary cylinder 268 to well rotate stably without friction when a supporter 266 is set in the depression 265. Therefore, the disc guide 272 moves in the upward and downward directions without rotating according to the rotary direction of the rotary cylinder 268. FIG. 23 illustrates a sectional view showing the odor element cell in which a plurality of the odor passage through-holes 292 of the second head 274 are opened (ON). Therefore, since a plurality of the odor passage through-holes 298 of the first head 300 are opened (ON) and a plurality of the odor passage through-holes 292 of the second head 274 are opened (ON), compressed odorous air filled in the inner space 308 of the odor element cell 304 is emitted outside through the inner passage 260 of the pipe 258.

Figure 24:
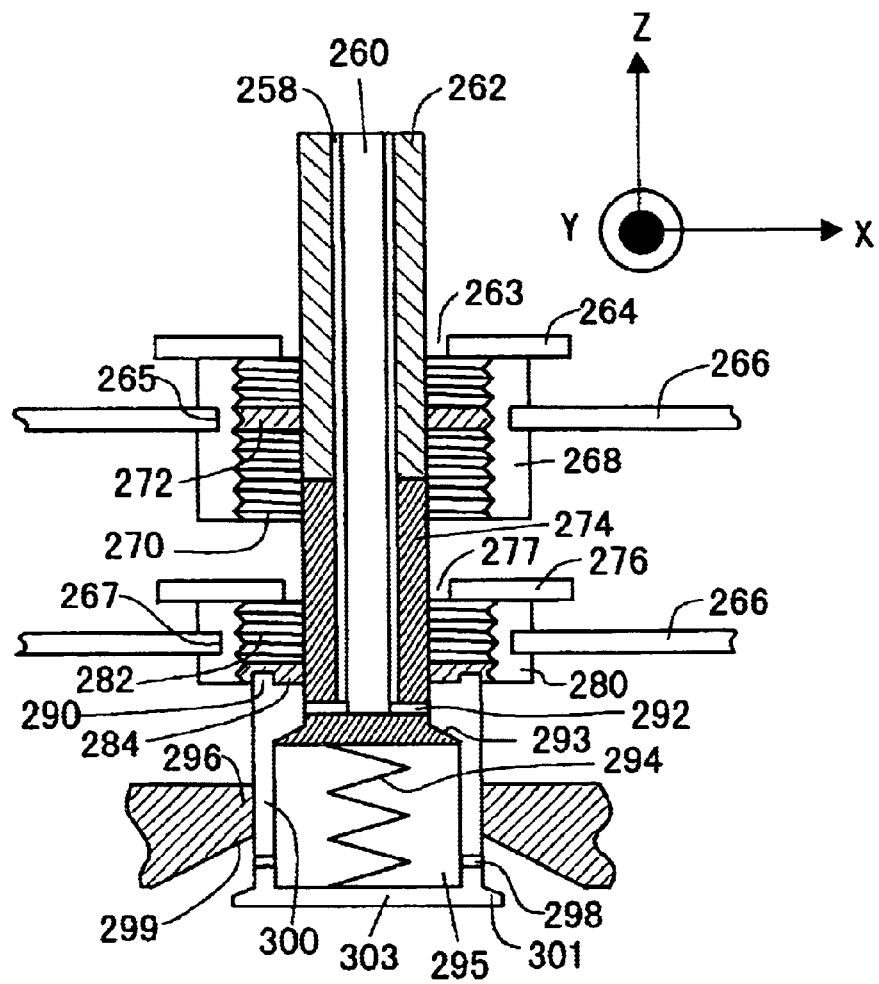
FIG. 24 illustrates a sectional view showing the odor element cell in which the first head is opened (ON) and the second head is closed (OFF) in the odor element cell in FIG. 23.

FIG. 24 illustrates a sectional view showing the odor element cell in which the first head is opened (ON) and the second head is closed (OFF) in the odor element cell in FIG. 23. Explanation relating to functions is the same as the case in FIG. 23.

Figure 25:
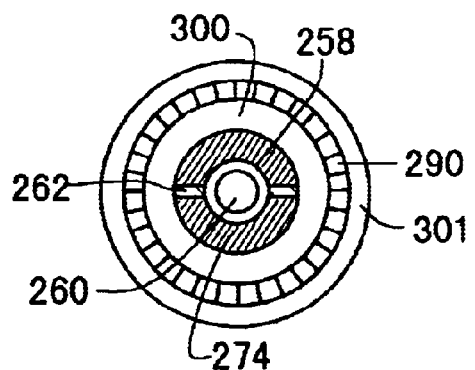
FIG. 25 is a top view of the first and second head viewed from the upper side (+Z) of a pipe.

FIG. 25 is a top view of the first and second head viewed from the upper side of a pipe. The support side plate 262 is provided on the outside circumference of the pipe 258. A plurality of projections 290 are provided on the upper outside circumference of the first head 300 and they form uneven surface. A plurality of projections 290 are set in depressions of the single side of the disc guide 284. Therefore, the disc guide 284 controls an up-and-down movement of the first head 300 without idleness and the first head 300 to open and shut the odor passage through-hole 298.

Figure 26:
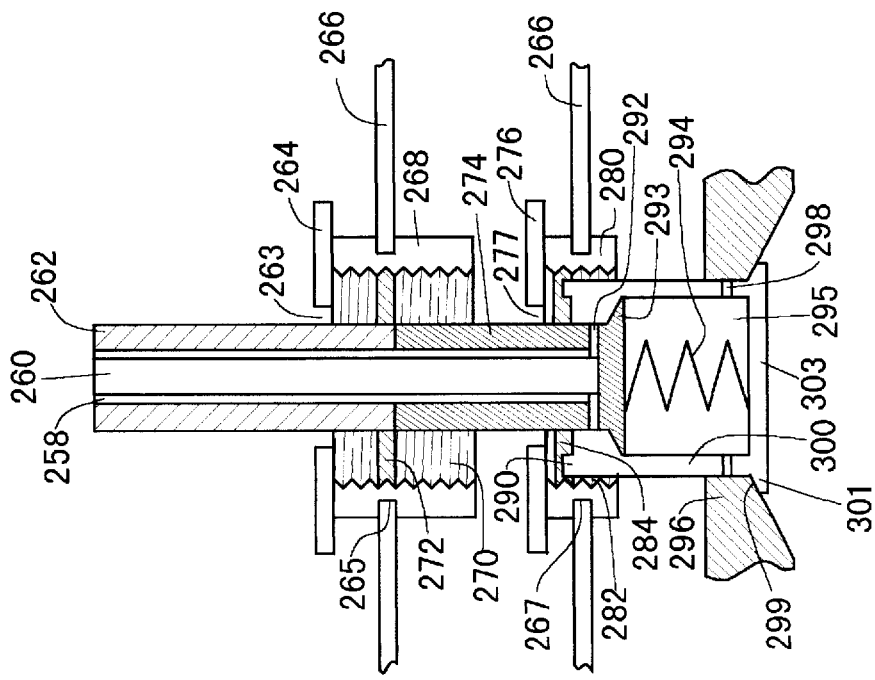
FIG. 26 illustrates a sectional view showing the odor element cell in which the first head is closed (OFF) and the second head is closed (OFF) in the preferred embodiment shown in FIG. 23.

FIG. 26 illustrates a sectional view showing the odor element cell in which the first head is closed (OFF) and the second head is closed (OFF) in the preferred embodiment shown in FIG. 23. Explanation relating to functions is the same as the case in FIG. 23.

Figure 27:
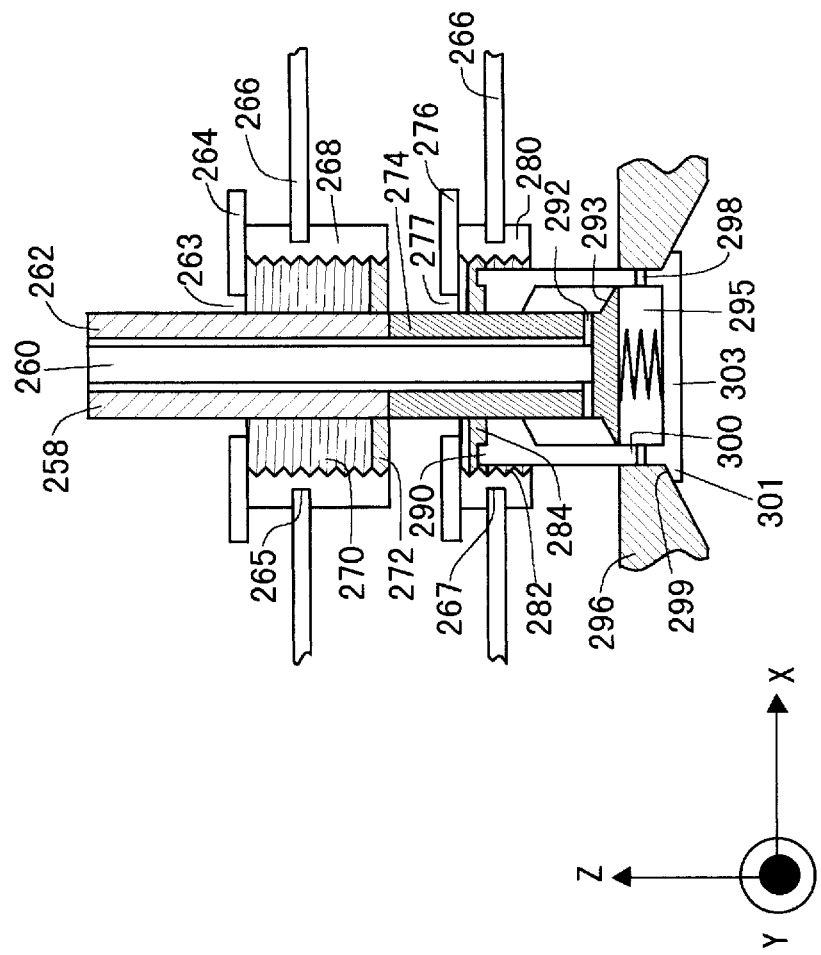
FIG. 27 illustrates a sectional view showing the odor element cell in which the first head is closed (OFF) and the second head is opened (ON) in the preferred embodiment shown in FIG. 23.

FIG. 27 illustrates a sectional view showing the odor element cell in which the first head is closed (OFF) and the second head is opened (ON) in the preferred embodiment shown in FIG. 23. Explanation relating to functions is the same as the case in FIG. 23.

Figure 28:
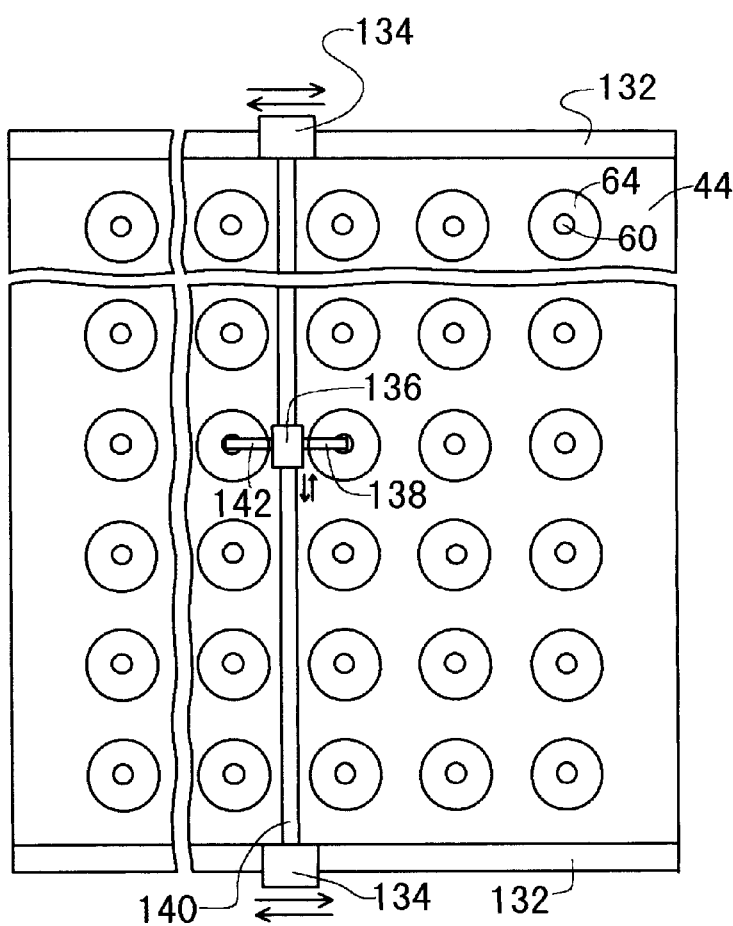
FIG. 28 is a top view of a movable selection mechanism as the third preferred embodiment of the odor element selection mechanism.

FIG. 28 is a top view of a movable selection mechanism as the third preferred embodiment of the odor element selection mechanism 46. The movable selection mechanism includes an X-axis selection mechanism 134 shifting in the X-axis direction, a Y-axis selection mechanism 136 shifting in the Y-axis direction, nozzle pressure parts 138 and 142, a rail 132 on which the X-axis selection mechanism 134 shifts, and a rail 140 on which the Y-axis selection mechanism 136 shifts. A plurality of the odor emitting nozzles 60 of the odor cells project in the upward directions from the mounting plate 44 in which the plug 64 is connected with the socket (not shown in the figure) not having the nozzle fix plate 74. The nozzle pressure parts 138 and 142 push the odor emitting nozzle 60 according to an input selection signal selecting one (or two) of the odor emitting nozzles. Pushed odor emitting nozzle releases the odor gas in the air path 48.

Figure 29:
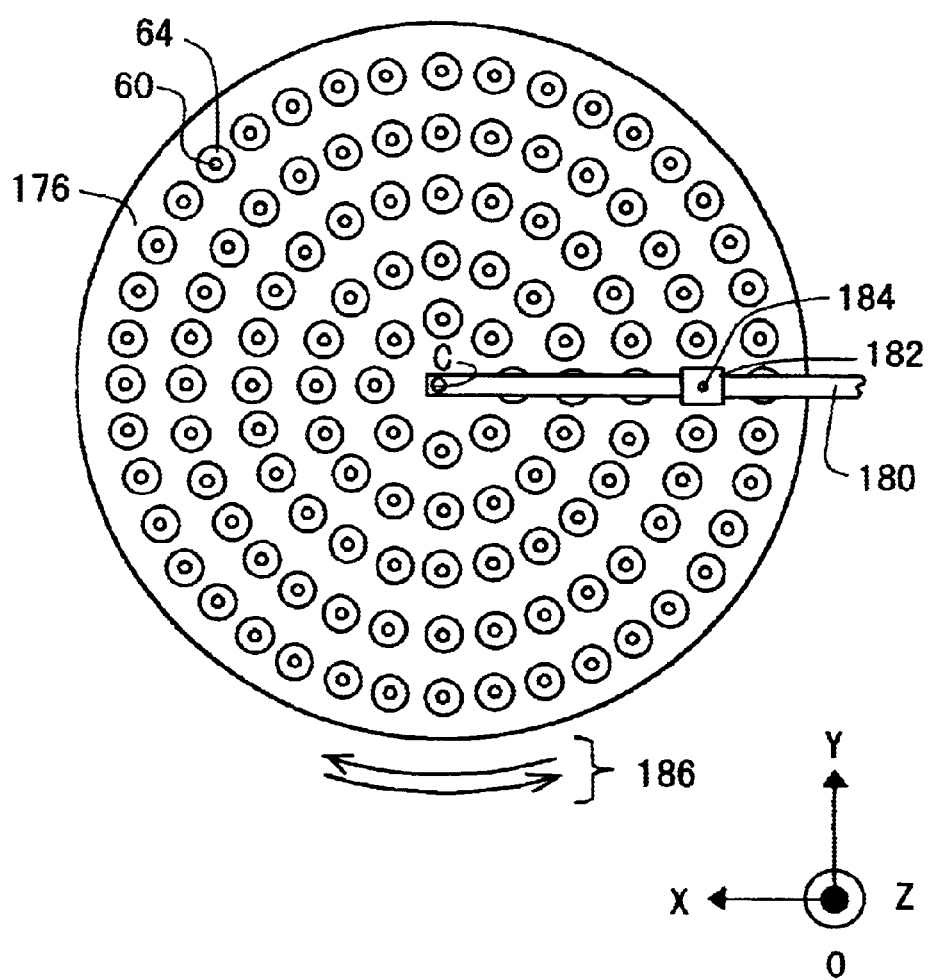
FIG. 29 is a top view of a movable selection mechanism of a rotary odor element cell layer as the fourth preferred embodiment of the odor element selection mechanism.

FIG. 29 is a top view of a movable selection mechanism of a rotary odor element cell layer as the fourth preferred embodiment of the odor element selection mechanism 46. A base 176 mounting odor element cells rotates on a center axis "C" in the arrow directions 186 by a rotary mechanism (not shown in the figure). Each cell of odor element cells in the X and Y axes is installed in such a way that each plug 64 of each odor emitting nozzle is engaged with the socket (not shown in the figure) installed in the base 176 and each odor emitting nozzle 60 projects upward (+Z direction) from the base 176. The nozzle pressure unit 182 moves (±X directions) and locates above the position of the odor emitting nozzle 60 of the designated odor element cell on the nozzle movement part 180 according to the input nozzle pressure control signal. Next, the designated odor gas is released from the odor emitting hole 184 of the odor element cell by the odor emitting nozzle 60 being pressed. The nozzle movement part 180 is capable of being any kind of movement mechanism, such as a rotary screw method, a rack and pinion method, a spiral gear and wheal method, an electromechanical method, and other things, in order to move in the ±X directions.

Figure 30:
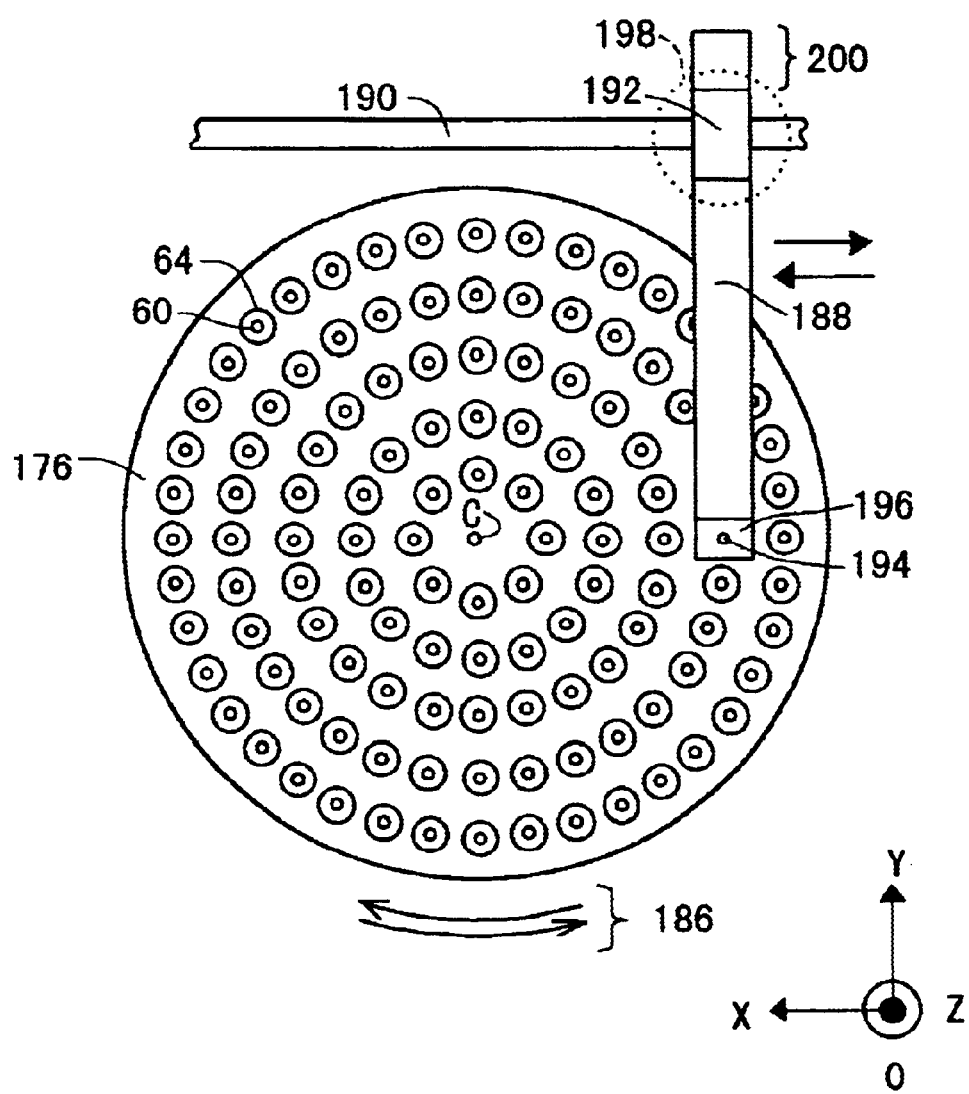
FIG. 30 is a top view of a movable selection mechanism of a rotary odor element cell layer as the fifth preferred embodiment of the odor element selection mechanism.

FIG. 30 is a top view of a movable selection mechanism of a rotary odor element cell layer as the fifth preferred embodiment of the odor element selection mechanism 46. Although the same rotary odor element cell layers are used in the fourth and fifth preferred embodiments, different types of pressure units to press the odor emitting nozzle 60 are used. The movable selection mechanism of the rotary odor element cell layer of the fifth preferred embodiment includes a head seeking arm 188, a horizontal (±X direction) movement unit 190, a movement mechanism 192, an odor emitting hole 194, and a nozzle pressure head 196. The head seeking arm 188 locates above the designated odor element cell by the movement mechanism 192 being moving in the horizontal direction (±X direction) according to an input nozzle pressure control signal. Next, the odor is emitted from the odor emitting hole 194 since the nozzle pressure head 196 presses the odor emitting nozzle 60 of the designated odor element cell by an end portion 200 of the head seeking arm 188 being pressed upward by an end portion 200 of the head seeking arm 188 pivoting on the point of the movement mechanism 192 as a fulcrum 198 by an upward pressure unit (not shown in the figure). The horizontal (±X direction) movement unit 190 is capable of being any kind of movement mechanism, such as a rotary screw method, a rack and pinion method, a spiral gear and wheal method, an electromechanical method, and other things, in order to move in the horizontal (±X) directions.

Figure 31:
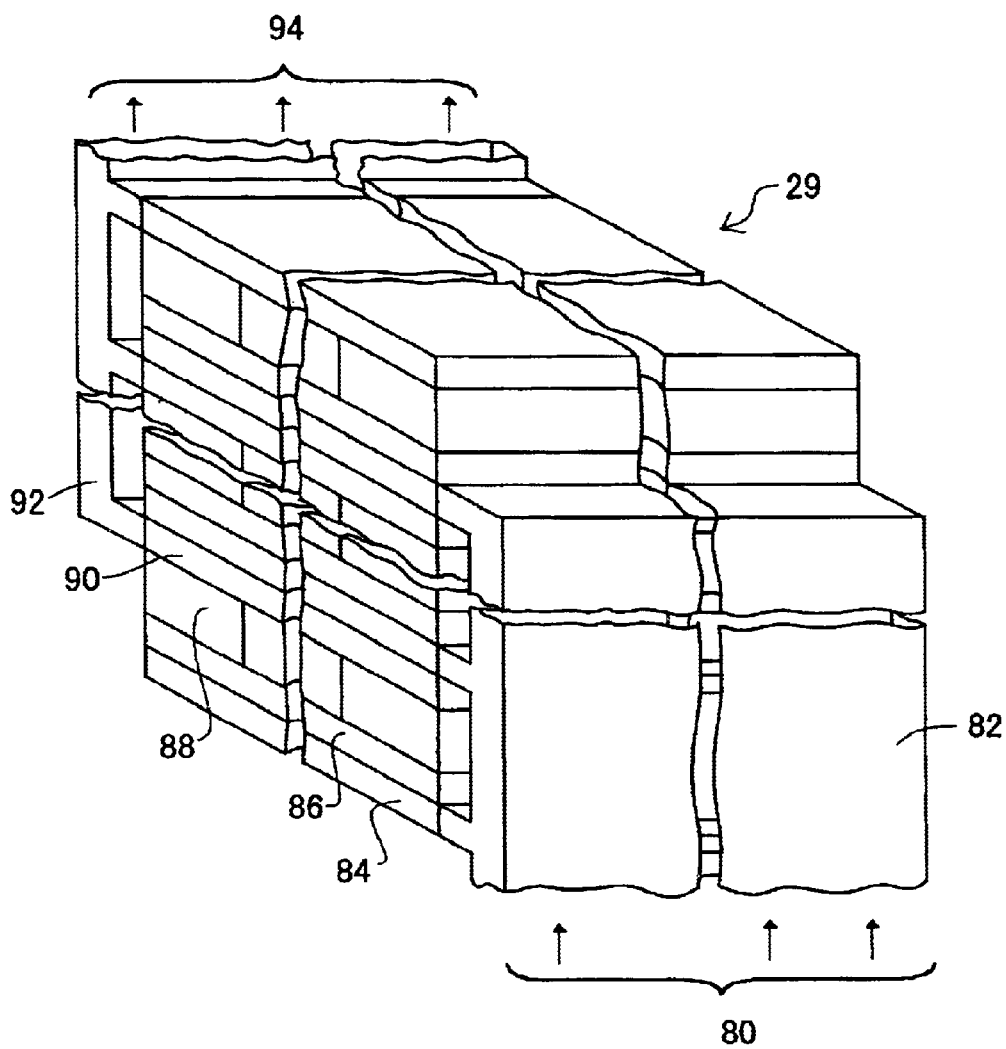
FIG. 31 illustrates the second preferred embodiment of the odor element cell storage unit as the element unit of OB of the odor emission unit.

FIG. 31 illustrates the second preferred embodiment of the odor element cell storage unit 29 as the element unit of OB 32 of the odor emission unit 31. Deodorized air 80 is blown into an input air duct 82. The input air duct 82 is connected with a lower air passage 84. The one end of lower air passage 84 is opened and the other end of the lower air passage 84 is closed. The odor element selection mechanism 86 is set in the upper layer of the lower air passage 84. A hole (not shown in the figure) is provided in the upper portion of the lower air passage 84 in order for the input air to blow toward the odor element selection mechanism 86. A plurality of odor element cells are arranged in the upper portion of the odor element selection mechanism 86. An upper air passage 90 is installed in the upper layer of an odor element cell 88. As explained in detail in the latter part of the specification, the air passage hole is provided in each of odor contents included in a plurality of the odor element cell 88, and it leads to each hole (not shown in the figure) of the upper air passage 90 installed on the upper side of the each odor element cell 88. One end of the upper air passage 90 is closed and the other end of the upper air passage 90 is linked to an output air passage 92. Therefore, air inside the upper air passage 90 flows out into the output air passage 92. The deodorized air 80 passes through the input air duct 82 and the lower air passage 84, input air from input air duct 82 carries out the produced odor that has passed through the odor element cell 88 by the odor element selection mechanism 86 being selected into the upper air passage 90 and then outputs an output odor 94 through the output air passage 92. The odor passage, such as the input air duct 82, the lower air passage 84, the upper air passage 90, and the output air passage 92, is made of a special material such as stainless steel, glass, and melamine resin (Decola) to which none of odorous element is capable of being adhered. The number of odor element cell layers is one or more layers. Here, an odor element selection mechanism is installed between the odor element cell 88 and the upper air passage 90 according to the odor volatilization characteristic of the odor element cell and thus the specified odor element constituent is capable of being selected with high precision, although it is not shown in the same figure.

Figure 32:
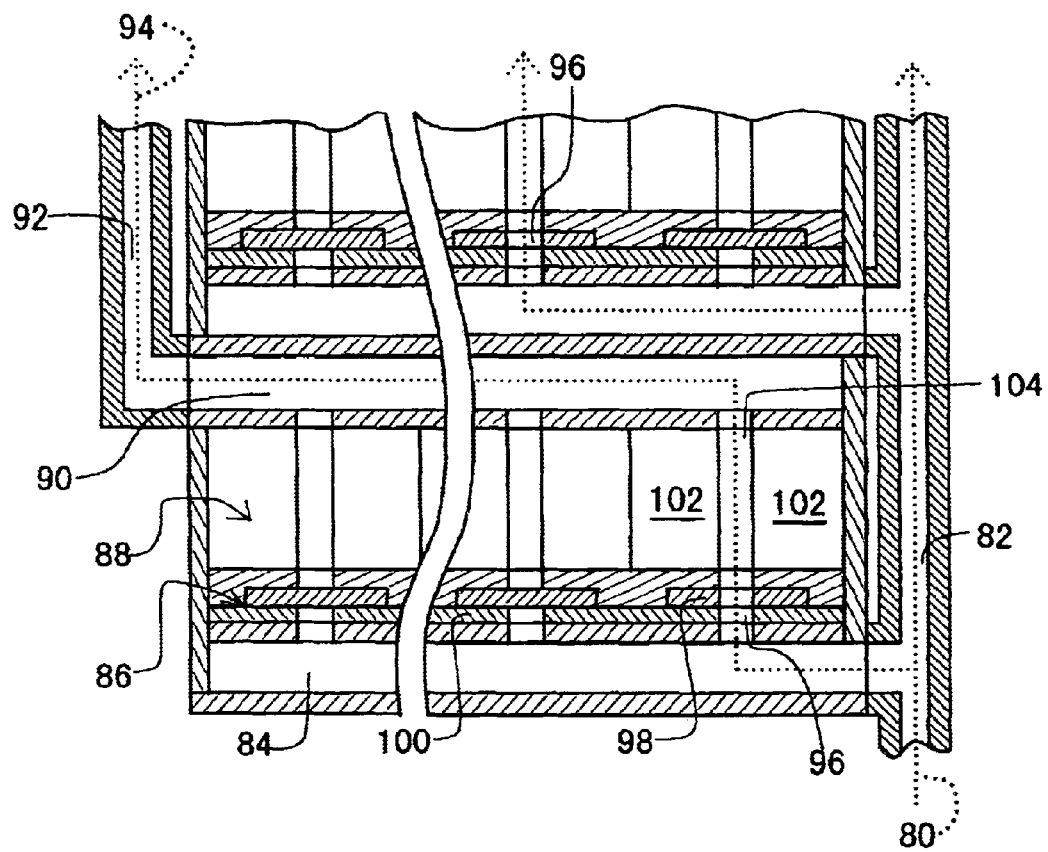
FIG. 32 is a longitudinal section of the second preferred embodiment of the odor element cell storage unit of FIG. 31.

FIG. 32 illustrates a longitudinal section of the second preferred embodiment of the odor element cell storage unit 29 of FIG. 31. The deodorized air 80 is sent into the input air duct 82. Air that is blown into the lower air passage 84 thorough the input air duct 82 passes thorough the odor substance passage hole 96 that is opened ("ON" condition) in order for air to be blown according to the odor element selection mechanism 86, passes thorough an odor content 102, and thus the air flow including the odor is output into the upper air passage 90. The blown odor air flow of the upper air passage 90 furthermore passes through the output air passage 92 and is output as the output odor 94. Here, an odor element selection mechanism is installed between the odor element cell 88 and the upper air passage 90 according to the odor volatilization characteristic of the odor element cell and thus the specified odor element constituent is capable of being selected with high precision, although it is not shown in FIG. 31.

Figure 33:
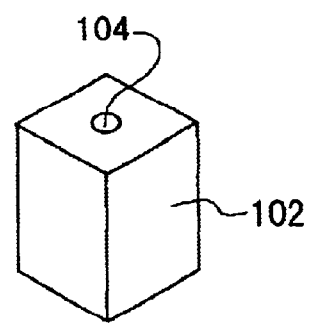
FIG. 33 illustrates the perspective view showing the odor content contained in the odor element cell.

FIG. 33 illustrates the perspective view showing the odor content 102 contained in the odor element cell 88. The odor content 102 is capable of being any kind of material such as solid odor material, sublimation solid odor material in which the odor is mixed, porosity solid odor material in which the odor is absorbed, and so forth. A through-hole 104 is provided in the central part of the odor content 102. An air passes the through-hole 104 and then the odor flow is made. Although it is shown that the shape of the odor content 102 is a quadrilateral form, any kind of shape such as a cylindrical form and other arbitrary forms is capable of being used.

Figure 34:
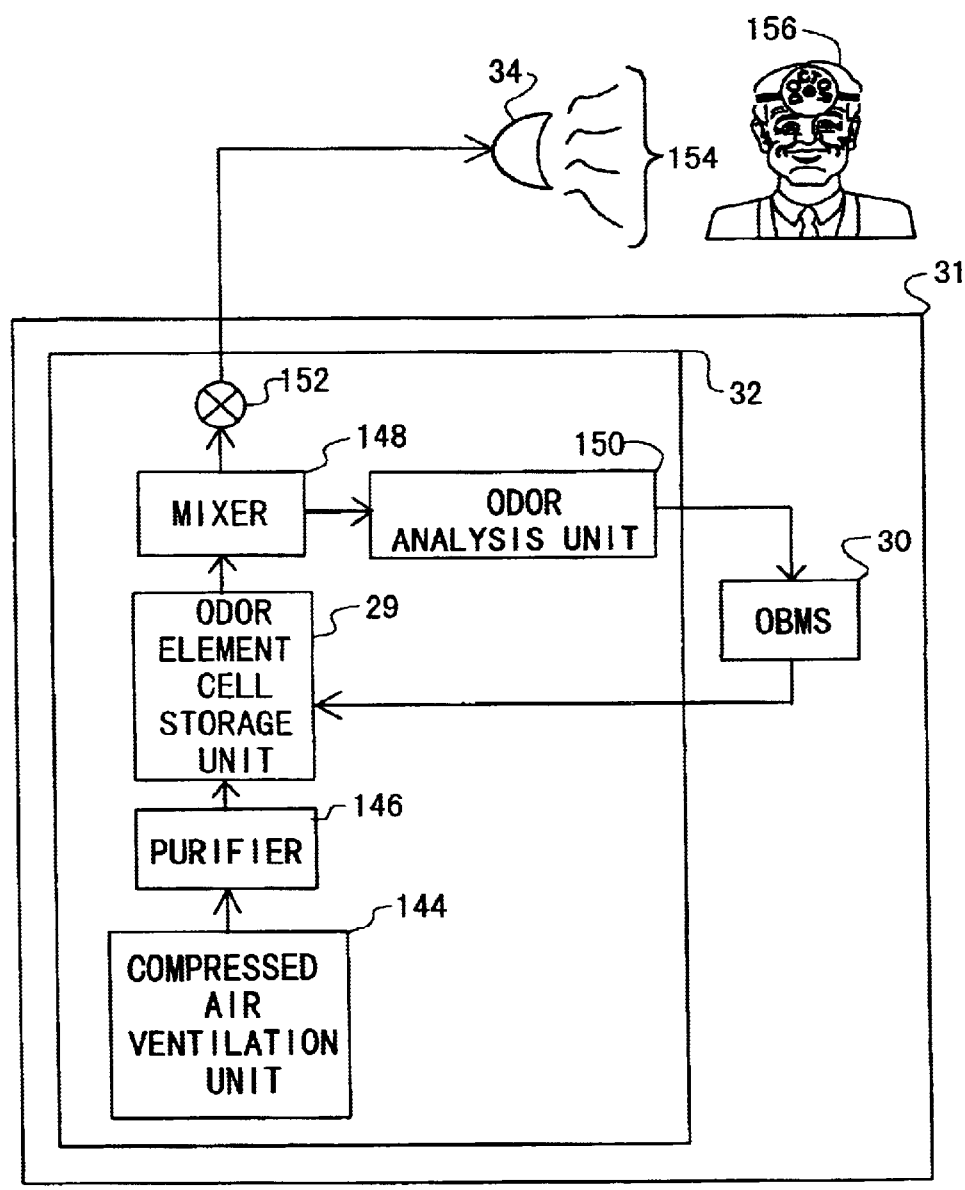
FIG. 34 illustrates in detail a block diagram of the odor emission unit.

FIG. 34 illustrates in detail a block diagram of the odor emission unit 31. The odor emission unit 31 includes OBMS 30 and OB 32. OB 32 includes a compressed air ventilation unit 144, a purifier 146, the odor element cell storage unit 29, a mixer 148, an odor analysis unit 150, and an injection valve 152. Air sent from the compressed air ventilation unit 144 is sent to the purifier 146. The purifier 146 includes a lot of active cells with a lot of microscopic holes and blows the purified air, the harmful elements of which have been extracted from blown input air, into the odor element cell storage unit 29. The odorous air produced from the selected specified odor element cell of the odor element cell storage unit 29 is blown into the mixer 148. The odorous air in the mixer 148 is analyzed in the odor analysis unit 150 and the analyzed results for the odor information such as odor elements, mass, temperature, humidity, and so forth are output to OBMS 30. The odor analysis unit 150 includes the gas chromatograph, an infrared radiation, amass analyzer, a chemical sensor, and so forth. The odor element information transmitted from the odor communication system 8 for the sending site and the produced odor element information are compared in the OBMS 30. When the desired results are not acquired, OBMS 30 sends information of a fine adjustment for the odor being emitted so as to operate the odor element cell storage unit 29 in order for the designated odor element cell to emit the odor for making compensation until the desired results are acquired. The odorous air in the mixer 148 is analyzed in the odor analysis unit 150 and the analyzed results are output to OBMS 30. The OBMS 30 compares the odor information transmitted from odor communication system 8 for the sending site with the odor information of the odorous air element produced in the mixer 148. This process is repeated until the desired results are acquired. When the desired results are acquired, the injection valve 152 is opened and then the odor is output from the odor diffusion unit 34. A user 156 is capable of smelling the odor 154 transmitted from the odor communication system 8 for the sending site by smelling the odor 154 output from the odor diffusion unit 34.

Figure 35:
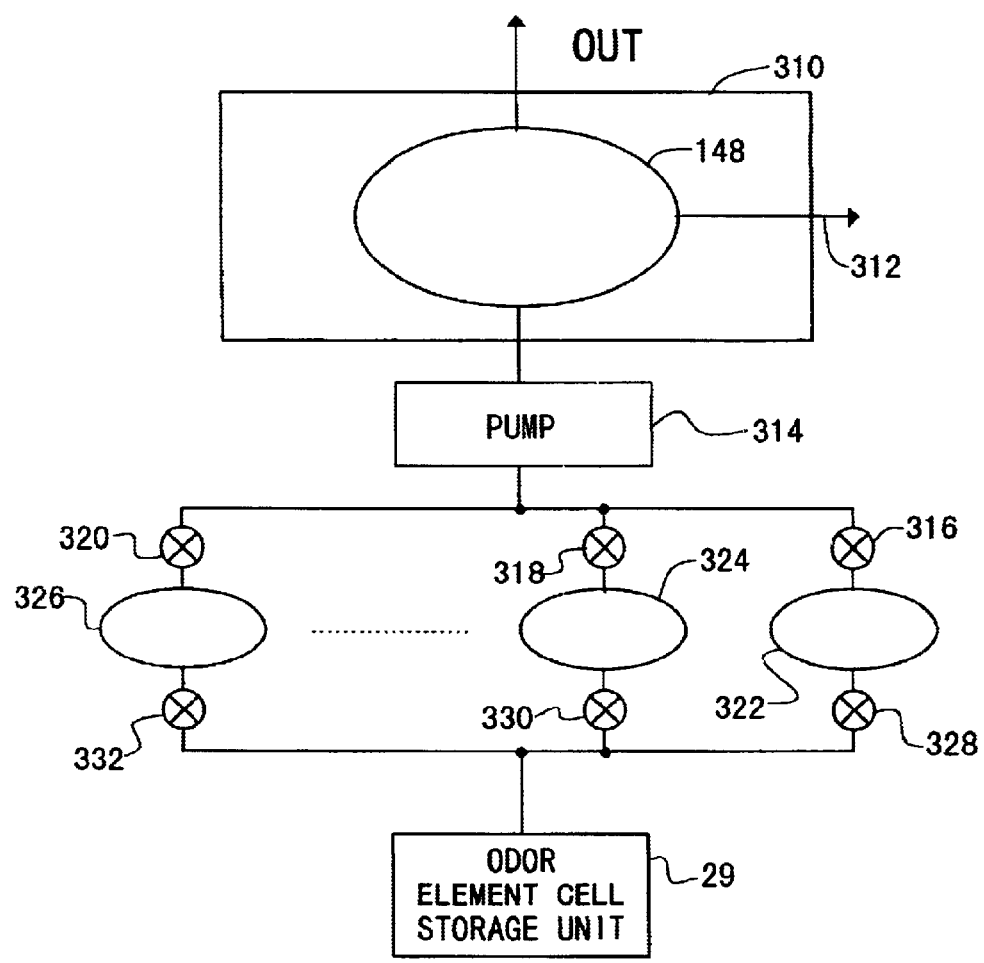
FIG. 35 illustrates an explanatory diagram showing the relationship between each of a plurality of temporal odor storage containers and a mixer.

FIG. 35 illustrates an explanatory diagram the relationship between each of a plurality of temporal odor storage containers and the mixer. The odor emitted from the odor element cell selected from the odor element cell storage unit 29 is temporarily stored in arbitrary one temporal odor storage container 322 according to the necessity. An inlet passage of the temporal odor storage container 322 has an input valve 328 for controlling the input volume and an outlet passage has an output valve 316 for controlling the output volume. The odor gas released from the other odor element cell is temporarily stored in arbitrary one temporal odor storage container 324 as the need arises. An inlet passage of the temporal odor storage container 324 has an input valve 330 for controlling the input volume and an outlet passage has an output valve 318 for controlling the output volume. Further, the odor gas released from the other odor element cell is temporarily stored in arbitrary one temporal odor storage container 326 as the need arises. An inlet passage of the temporal odor storage container 326 has an input valve 332 for controlling the input volume and an outlet passage has an output valve 320 for controlling the output volume. Further, the odor gas released from the other odor element cell is also temporarily stored in arbitrary one temporal odor storage container as the need arises. The odor stored in each temporal odor storage container is sent to the mixer 148 by a pump 314. The mixer 148 is installed in a temperature control container 310 for controlling and adjusting the odor mixture condition. In the process in which the odor is mixed in the mixer 148, a mixed odor 312 is sent to the odor analysis unit 150 and analyzed therein. When the desired odor is mixed and produced in the mixer 148, the odor is emitted from the mixer 148.

Figure 36:
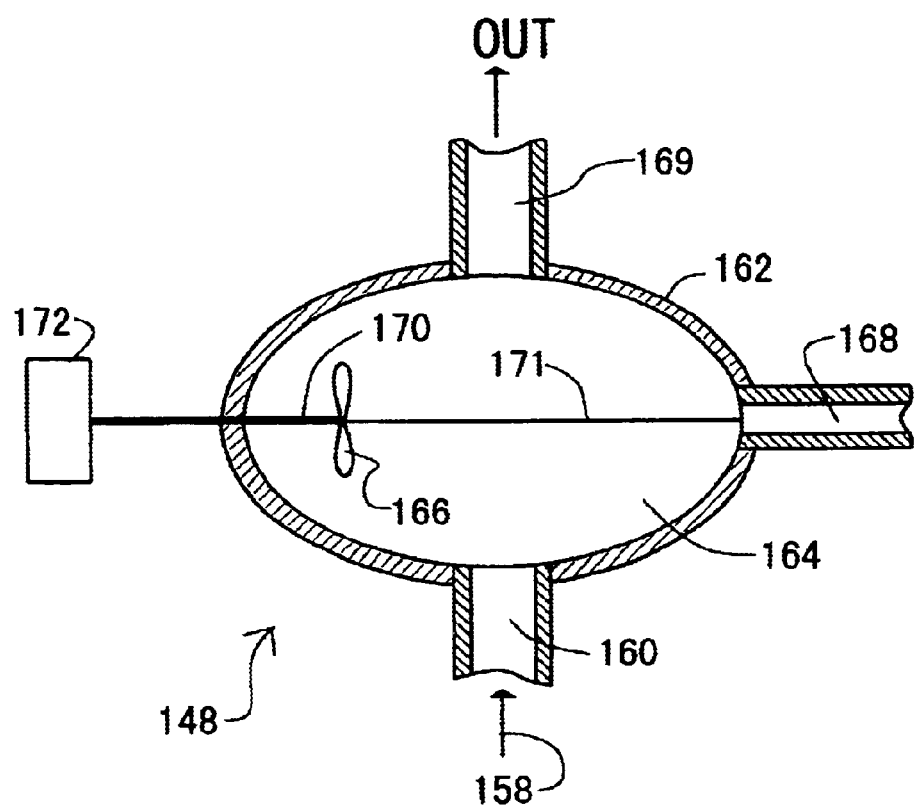
FIG. 36 illustrates the structure of the mixer.

FIG. 36 illustrates the structure of the mixer 148. The mixer 148 includes an odor inlet passage 160, a mixer body cover 162, an analysis odor outlet passage 168, an odorous air outlet passage 169, an agitator fan 166, a shaft 170, and a drive motor 172. The mixer body cover 162 includes an upper cover and a lower cover, and they engage adherently with each other in an engaging portion 171. Odorous air 158 is produced from the odor element cell storage unit 29 by the designated odor element cell being selected and blown into the inside of the mixer 164 through the odor inlet passage 160 of the mixer 148. The mixer body cover 162 is capable of improving the agitating efficiency of the odorous air of the inside of the mixer 164 by the shape of the mixer body cover 162 being formed to a rounded shape. The body of the mixture is made of a special material such as stainless steel, glass, and melamine resin (Decola) to which none of odorous element is capable of being adhered. Otherwise, the inside surface of the body of the mixture may be coated with a special material such as stainless steel, glass, and other material to which none of odorous element is capable of being adhered.

Figure 37:
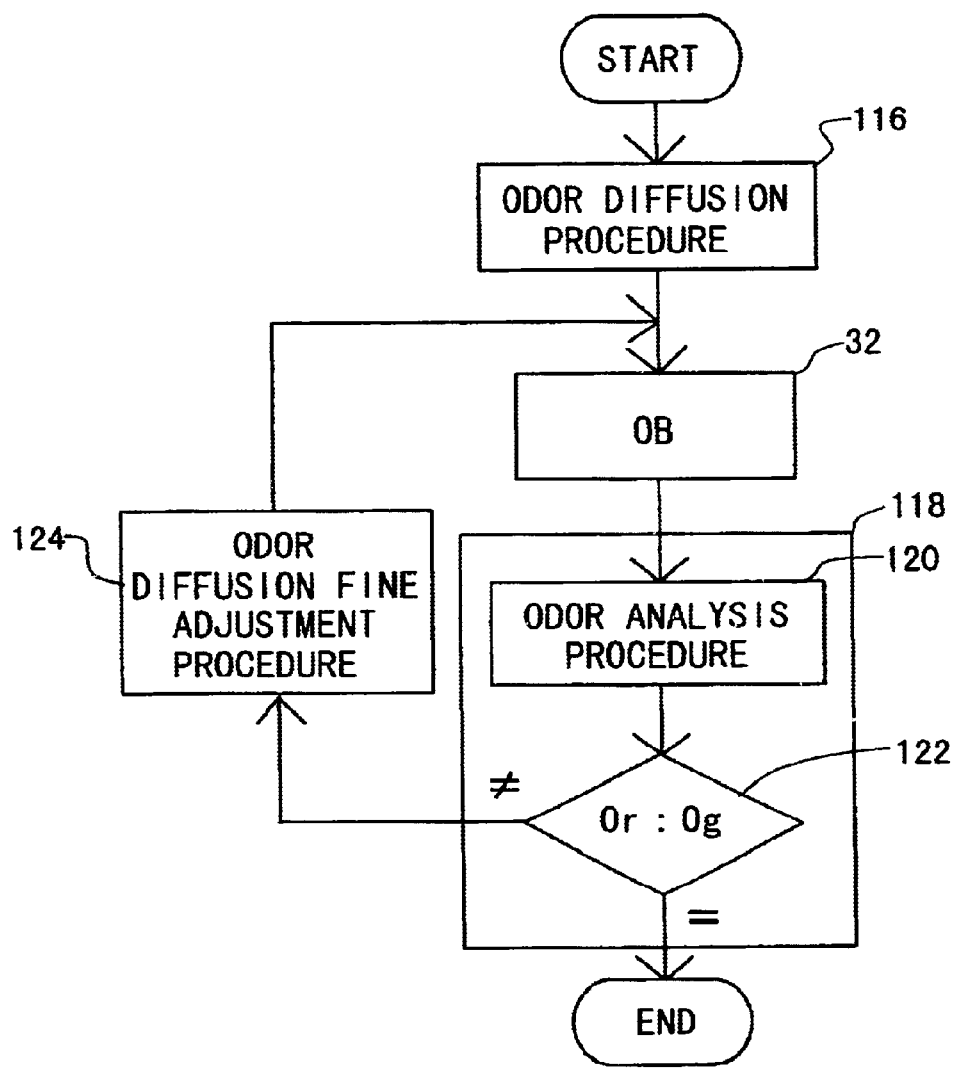
FIG. 37 is a flowchart of a procedure of OBMS.

FIG. 37 is a flowchart of a procedure of OBMS. An odor producing method includes an odor diffusion procedure 116 for producing and diffusing the odor, an odor comparison procedure 118 for analyzing and comparing produced and diffused odors, and an odor diffusion fine adjustment procedure 124 for repeating the odor diffusion fine adjustment processing until the designated comparison result is attained based on the results of the odor comparison procedure and the designated odor is produced by the designated comparison result being obtained. OBMS 30 executes the odor diffusion procedure 116 to OB 32 based on odor information obtained from DBMS 24. The odor emitted and diffused from OB 32 is analyzed in an odor analysis procedure 120 using the same way and method as previously described way and method using the odor analysis apparatus. Next, the comparison 122 is executed between received odor information Or and produced odor information Og. The comparison 122 is executed including the gas chromatography graph which is partial information of the received odor information Or and produced odor information Og. The gas chromatography graph transmitted from the data transmitting system includes the keeping time (minute) and the peak value of the odor element constituent. In the same way, the gas chromatography graph of the odor obtained by the odor element cell storage unit being operated includes the keeping time (minute) and the peak value of the odor element constituent. If there is a gap between the results of the comparison 122 between Or and Og, the odor diffusion fine adjustment procedure 124 is repeated until the desired odor is obtained by the odor diffusion fine adjustment procedure 124 being executed. At this time, if, the produced odor is harmful or dangerous to the human being and the circumstances by being compared with harmful odor constituent information (not shown in the figures) installed beforehand, the injection valve 152 is closed and the dangerous situation is informed to the user by beep sound being alarmed and being displayed on the screen without releasing the produced odor. If the produced odor is not harmful or dangerous to the human being and the circumstances, the injection valve 152 is opened and the normal situation is informed to the user by odor information such as a constituent, an odor element classification, a category, and other odor information being displayed on the screen with the produced odor being released. Computer programs for executing processing, such as the odor diffusion procedure 116 for producing and diffusing the odor from the odor base, the odor comparison procedure 118 for analyzing and comparing the produced and diffused odors, and the odor diffusion fine adjustment procedure 124 for repeating the odor diffusion fine adjustment processing until the predetermined comparison result is obtained based on the results of the odor comparison processing described before are recorded in a recording media 35.

The most effective odor density is capable of being determined by the relationship between the sensitivity strength of the human being and the impulsive strength caused by the density of the odor material being applied. According to Weber-Fechner's law for the sensitivity, the relationship between the sensitivity strength of the human being and the impulsive strength caused by the density of the odor material is $$R = K \log S$$

where R is the sensitivity strength of the human being, S is the impulsive strength caused by the density of the odor material, and K is a constant. According to Stevens' law for a power, the relationship between the sensitivity strength of the human being and the impulsive strength caused by the density of the odor material is $$R = K \cdot S^n$$

where R is the sensitivity strength of the human being, S is the impulsive strength caused by the density of the odor material, n is a constant defined by a type of sensitivity, and K is a constant. Since the value of n is nearly 0.5 in general, the relationship between the sensitivity strength of the human being and the impulsive strength caused by the density of the odor material is $$R = K\sqrt{S},$$

thus the sensitivity strength of the human being is in proportional to the square root of the impulsive strength caused by the density of the odor material.

In all cases, the sensitivity strength of the human being becomes less and the sensory nerve does not work keenly if the density of the odor material becomes too thick. Thus, the most effective odor is capable of being produced by the relation described in the above being applied in order to set the most effective odor density. The desired odor is capable of being produced effectively by the relationship between the sensitivity strength of the human being and the impulsive strength caused by the density of the odor material being applied and the result in which any difference has not been found in the comparison 122 between Or and Og being considered. Processing terminates if the desired odor has been produced effectively.

Figure 38:
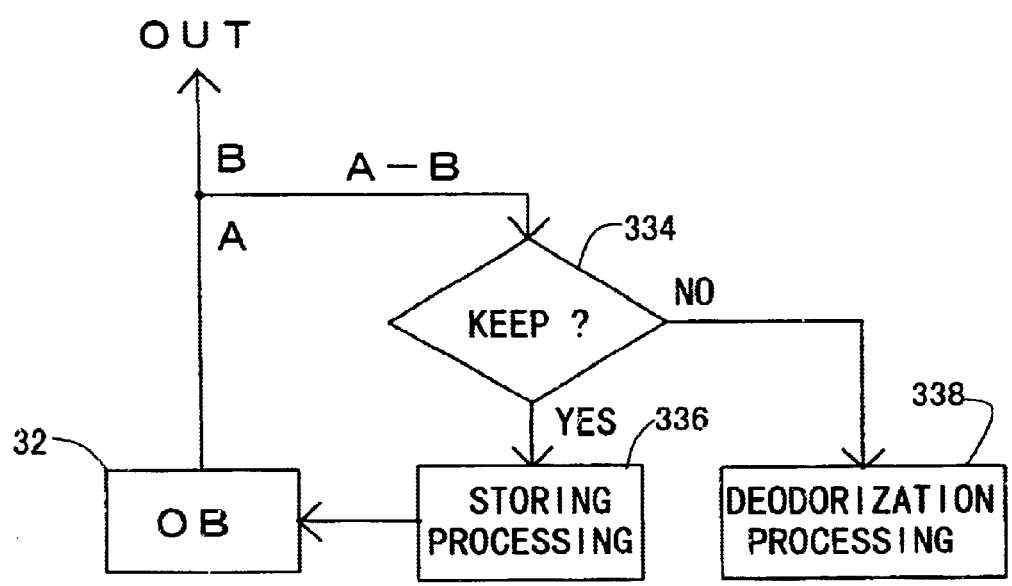
FIG. 38 is an explanatory view showing odor storing processing the odor of which is produced in OB.

FIG. 38 is an explanatory view showing odor storing processing the odor of which is produced in OB 32. The volume (B) f the odor of the volume (A) of the odor output by OB 32 is output OUT, and the determination 334 is made to determine whether or not the excess volume (A–B) of the odor should be stored. When the determination of storing (YES) is made, storing processing 336 is executed, the process is returned back to OB 32, and storing processing is executed according to the necessity. When the determination of not storing (NO) is made, deodorization processing 338 is executed.

Figure 39:
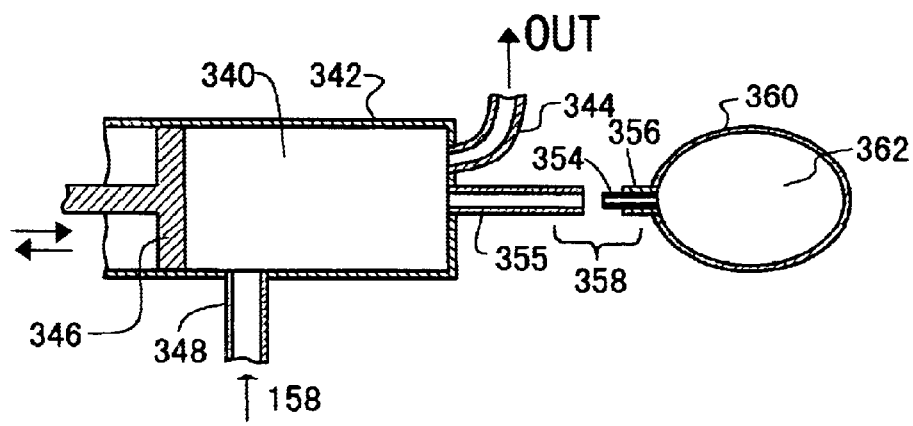
FIG. 39 is the first preferred embodiment of an odor storing device.

FIG. 39 is the first preferred embodiment of an odor storing device. The odorous air 158 flows into an odorous room 340 through an odorous air inlet passage 348. The capacity of the odorous room 340 increases and decreases by a piston 346 sliding without any space on the inside wall (cylinder) of a body 342 of the odor storing device. An odor outlet passage 355 and an odorous air outlet passage 344 are provided in the end wall, facing with a crown of the piston 346, of the body 342. Valves are provided in the odorous air inlet passage 348, the odor outlet passage 355, and the odorous air outlet passage 344, and the odorous air flow is capable of being controlled according to the necessity, although they are not in the figure. In order to store the odor of the odorous room 340, the valves of the odorous air inlet passage 348 and odorous air outlet passage 344 are closed, then a pipe 354 of a connector 356 of a temporal odor receptacle 360 is put into the end of the odor outlet passage 355 and they connect in a connection portion 358 in order for the odor not to leak outside. Next, the odor of the odorous room 340 is stored in the odor receptacle room 362 of the temporal odor receptacle 360 by the piston 346 being moved in one direction of both moving directions to decrease the capacity of the odorous room 340. The odor of the odor receptacle room 362 is stored in the odor element cell according to the necessity. Accordingly, a new odor is capable of being emitted from OB 32 by the new odor element cell being installed.

Figure 40:
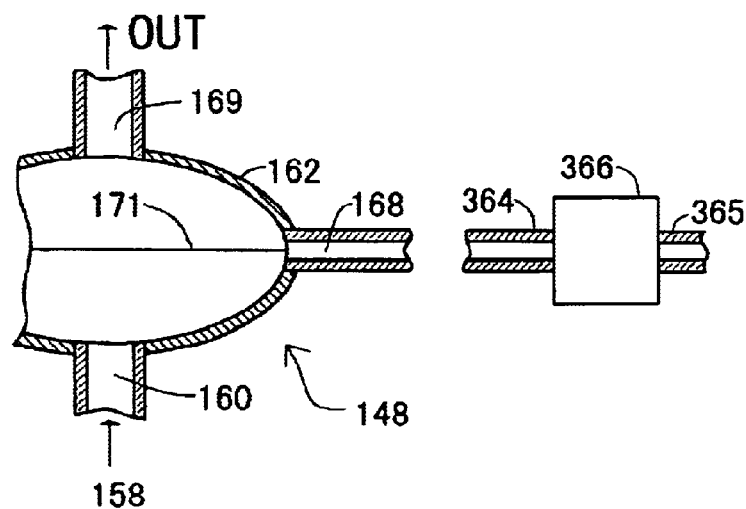
FIG. 40 is the second preferred embodiment of an odor storing device.

FIG. 40 is the second preferred embodiment of an odor storing device. The odor outlet passage 168 of the mixer 148 as explained in FIG. 36 is connected to an inlet pipe 364 of the pump 366 and the pipe 354 of the connector 356 of the temporal odor receptacle 360 is connected to the outlet pipe 365. By starting the pump 366, the odor in the mixer 148 is stored in the odor receptacle room 362 of the temporal odor receptacle 360. The odor of the odor receptacle room 362 is stored in the odor element cell according to the necessity. Accordingly, a new odor is capable of being emitted from OB 32 by the new odor element cell being installed.

FIG. 41 shows contents of data transmitted from the odor communication system for the sending site 8. Odor information 126 analyzed by the odor analysis unit 12 of the odor communication system 8 for the sending site includes ID, an odor element, mass, mass ratio, temperature, humidity, and graph data. ID is an identification number of the odor element. ODOR ELEMENT is the odor element as an odor constituent of the odor substance collected by an odor collector 10. The odor elements such as geraniol, vanillin, menthol, and so forth are described in the same figure as an example. MASS is each odor element mass ($\mu$g) MASS RATIO is each element mass ratio. TEMP is odor collection temperature (° C.). HUMID is odor collection humidity (%). GRAPH DATA is an identification number of the graphic data obtained from the gas chromatograph.

FIG. 42 is a graph in which the graphic data obtained from the gas chromatograph corresponds to each identification number ID. Each odor constituent, which is a part of the odor substances, collected by the odor collector 10 has each peak designated by each ID number 1, 2, 3, . . . , and so forth. The graphic data obtained from the gas chromatograph contains odor keeping time (minute) and each ID corresponding to each peak of each odor.

FIG. 43 is an odor record 128 stored in DB 26. The odor record 128 includes ID for identifying the odor record, CLASS for showing an odor class as the classification, ODOR ELM. for showing the odor substance (chemical substance) as the odor element, POS. X for showing the position of the X-axis selection arm as the X position, POS. Y for showing the position of the Y-axis selection arm as the Y position, POS. Z for showing the position of the Z-axis selection arm as the Z position, START for the starting date of the odor element cell, VALID for the term of validity of the odor cell, and ROOT for the root odor classification for basically classifying the odor. According to Aristotle as shown in the idea expressing "A Sense and A Sensible Thing" as explained before in the specification, the root odor classification is capable of being divided into seven classes such as sweet, sour, pungent, rich, fatty, astringent, and excreta. The root odor classification is defined by these classes. The odor record 128 is modified based on the above contents when a new odor element cell is added and installed in the odor element cell storage unit 29. The odor record 128 includes odor sense threshold value (ppm) of odor density in which the human being is capable of sensing the odor, gas chromatograph threshold value (ppm) of odor density in which the gas chromatograph is capable of sensing the odor, odor recognition threshold value (ppm) of odor density in which the human being is capable of recognizing the odor, and so forth, although they are not shown in the figure. Information explained here is used so as for the most effective odor density to be decided based on the relationship between the sensitivity strength of the human being and the density of the odor substance. Each of the X position in which the X-axis selection arm located, the Y position in which the Y-axis selection arm located, and the Z position in which the Z-axis selection arm located is located on each axis of coordinates shown below in FIG. 2 respectively. For instance, the odor element geraniol, ID of which is "1," is located on the first position of the X-axis selection arm, the third position of the Y-axis selection arm, and the second position in the Z direction. As already explained in FIG. 16, the odor substance pass hole for passing odorous air is capable of being 30 opened when the arm movement mechanism 108 of the first X-axis selection arm 100 works and the arm movement mechanism 112 of the third Y-axis selection arm 98 works in order to open the odor substance pass hole. The position of the odor substance passage hole 96 and the hole position of the socket of the odor element cell of geraniol are agreed with each other. Thus, the odorous air is released from the odor element cell thorough these holes.

FIG. 44 is an OB management record containing OB management information. Each of odor information 126 stored in DB 26 corresponding to each of IDs is extracted by DBMS 24. OBMS 30 creates the OB management record 130 based on each of odor information 126 for each of ID extracted by DBMS 24. OBMS 30 manages OB 32 corresponding to each of ID according to information of the OB management record 130. OB 32 includes ID for identifying the odor record, odor emission volume control information V for indicating odor emission time (second) for controlling the odor emission volume, the position X for indicating the position of the X-axis selection arm, the position Y for indicating the position of the Y-axis selection arm, and the position Z for indicating the position of the Z-axis selection arm, and so forth. OBMS 30 executes an process for producing a designated odor based on the OB management record 130.

INDUSTRIAL APPLICABILITY

According to the present invention which is embodied as explained above, the effects explained below are performed. The odor emission unit is capable of emitting the predetermined odor based on graphic data indicating odor keeping time and the peak value for indicating the strength of each odor element, humidity, temperature, mass and mass ratio, and each odor element of the odor source transmitted from the odor communication system for the sending site by the odor base management system (OBMS) managing the odor base (OB) including a plurality of odor element cells arranged in advance corresponding to each root odor classification of a plurality of odors.

The odor base management system is capable of emitting the odor by selecting the designated odor element cell from the odor base based on the OB management record containing odor emission volume control information for emitting the predetermined volume of the odor from the odor element cell and the position information for the horizontal direction (X), the vertical direction (Y), and the height direction (Z) for designating the odor element cell of the odor base.

According to a management signal that the odor base management system outputs, the odor element selection mechanism functions in order for the X-axis selection arm to move in both directions and for the Y-axis selection arm to move both directions. The odor element selection mechanism is capable of controlling odor emission in order for the odor element cell to release the odor substance when the odor substance pass hole of the X-axis selection arm of a plurality of X-axis selection arms agrees with the odor substance pass hole of the Y-axis selection arm of a plurality of Y-axis selection arms and in order for the odor element cell not to release the odor substance when the odor substance pass hole of the X-axis selection arm of a plurality of X-axis selection arms does not agree with the odor substance pass hole of the Y-axis selection arm of a plurality of Y-axis selection arms.

Further, each of the odor element cell layers is rotatable and the odor is capable of being emitted from the designated odor element cell by the nozzle pressure head moving in the horizontal direction (both directions), the odor element cell layer rotating, and the nozzle pressure head locating on the position of the designated odor element cell of one or more odor element cells forming the odor element cell layer to push the nozzle.

The odor base management system executes the odor diffusion procedure for producing and diffusing the odor from the odor base, the odor comparison procedure for analyzing and comparing the odors produced and diffused, odor diffusion fine adjustment procedure for fine adjusting the odor diffusion until the predetermined comparison result is attained based on the odor comparison processing result, and completes processing after the predetermined comparison result has been attained.

The odor comparison procedure compares odor information such as humidity, temperature, mass, and odor constituents transmitted from the odor communication system for the sending site with odor information such as humidity, temperature, mass, and odor constituents produced by the odor element cell storage unit being managed.

The odor comparison procedure compares the graphic data indicating odor keeping time (minute) and the peak value of the odor constituents transmitted from the odor communication system for the sending site with the graphic data indicating odor keeping time (minute) and the peak value of the odor constituents by the odor element cell storage unit being managed. Further, the odor comparison procedure is capable of comparing odor information with predetermined odor information based on the relationship between the sensitivity strength of the human being and the impulsive strength caused by the density of the odor material.

Furthermore, according to the present invention, the highly reliable odor communication system, which is not capable of being influenced by natural conditions and phenomena and does not have a limit of the distance for communication, is provided.

What is claimed is:

1. An odor communication system, comprising;
   a data transmitting system for sending information of mass and constituent of an odor of an odor source by an odor analysis unit being measuring; and
   a data receiving system for receiving said information transmitted from said data transmitting system in order to emit an odor based on mass and constituent information of said odor by an odor diffusion unit.

2. An odor communication system according to claim 1, wherein said odor analysis unit has an odor constituent separation unit for separating odor constituents of a source producing an odor and a mass analysis unit for outputting a mass spectrum of said odor constituents.

3. An odor communication system according to claim 1, wherein said data receiving system comprises:
   a database for storing an odor record including information for managing each odor element cell of a plurality of odor element cells arranged in advance corresponding to each root odor classification of a plurality of odors; and
   a database management system for extracting said odor record sent from data transmitting system corresponding to each odor element of an odor source.

4. An odor communication system according to claim 1, wherein said odor emission unit comprises:
   an odor base (OB) including a plurality of odor element cells arranged in advance corresponding to each root odor classification of a plurality of odors; and
   an odor base management system (OBMS) for managing and operating said odor base in order to emit designated odor based on each odor element, mass, mass ratio, temperature, humidity, and graph data showing each odor keeping time and each peak value indicating odor element intensity of said odor source sent from said data transmitting system.

5. An odor communication system according to claim 3, wherein said odor record has information for a horizontal direction position (X), a vertical direction position (Y), and a height position (Z) in order to designate said odor element cell of said odor emission unit, odor element, a start date of said odor element cell, a validity term of said odor element cell, and an identification number (ID).

6. An odor communication system according to claim 4, wherein said odor base management system selects a specified odor element cell from said odor base in order to emit an odor based on an OB management record including emission value control information in order to emit specified value of an odor from said odor element cell and position information of horizontal direction position (X), vertical direction position (Y), and height position (Z) in order to designate an odor element cell of said odor base.

7. An odor communication system comprising:
   an odor base (OB) which has a plurality of odor element cells arranged in advance corresponding to each root classification of a plurality of odors; and
   an odor base management system (OBMS) for managing and operating said odor base in order to emit a specified odor.

8. An odor communication system according to claim 7, wherein said odor base comprises:
   a compressed air ventilation unit for sending compressed air;
   a purifier for exchanging compressed air with purified compressed air;
   an odor element cell storage unit for outputting an odorous air containing an emitted odor in purified air by selecting an odor element cell according to an operation signal from said odor base management system;
   a mixer for mixing said odorous air output from said odor element cell storage unit;
   an odor analysis unit for outputting a constituent analysis result to said odor base management system by executing an odor constituent analysis of said odorous air mixed in said mixer;
   a valve for releasing or shutting off releasing an odor to an odor diffusion unit;
   a storing processing unit for storing said odorous air mixed in said mixer; and
   a deodorization processing unit for deodorizing said odorous air mixed in said mixer.

9. An odor communication system according to claim 8, wherein said mixer is formed by a round shape like a ball and has an odorous air inlet passage for flowing inward odorous air output from said odor element cell storage unit, a fan for agitating said odorous air, an analysis odorous air outlet passage for flowing outward odorous air to an odor analysis unit for analyzing odor, and an odorous air outlet passage for outputting said odorous air mixed in said mixer.

10. An odor communication system according to claim 8, wherein said odor element cell storage unit comprises:
    an odor element cell layer having an odor element cell row in which one or more odor element cells are arranged in a horizontal direction and an odor element cell column in which one or more odor element cells are arranged in a vertical direction;
    an odor element selection mechanism for releasing odor substance by selecting a desired odor element cell from one or more odor element cells of said odor element cell layer; and
    an odor element cell storage unit having layers in which one or more combination layers of one or more odor element cell layers and one or more odor element cell selection mechanisms are layered.

11. An odor communication system according to claim 10, wherein said odor element selection mechanism has each X-axis selection arm moving in the both directions and each Y-axis selection arm moving in the both directions, each of which has each odor passage through-hole provided without having any gap from each odor emitting nozzle installation position provided on each odor element cell of one or more odor element cells forming the odor element cell layer.

12. An odor communication system according to claim 10, said odor element selection mechanism functions to emit odor from said odor element cell when odor substance passage holes, which are in an X-axis selection arm and a Y-axis selection arm, of a plurality of the odor substance passage holes provided in a plurality of X-axis selection arms and Y-axis selection arms are in open condition and not to emit odor from said odor element cell when said odor substance passage holes are in closed condition.

13. An odor communication system according to claim 10, wherein said odor element cell selection mechanism of an odor emission unit functions in order for an X-axis selection arm to move in both directions and for a Y-axis selection arm to move both directions according to a management signal that an odor base management system outputs.

14. An odor communication system according to claim 10, wherein said odor element cell layer of an odor emission unit is rotatable and odor is emitted from designated odor element cell of one or more odor element cells of said odor element cell layer by a nozzle pressure head moving in both directions parallel with said odor element cell layer and said odor element cell layer rotating.

15. An odor communication system according to claim 10, wherein said odor element cell comprises:
   a container containing an odor substance;
   a body for containing odor gas with a gasified state in which an odor substance is compressed or mixed with deodorized compressed air in said container;
   a connector for connecting and engaging said odor element cell with a socket of amounting plate;
   a first head for flowing said odor substance through an odor passage through-hole; and
   a second head for releasing said odor substance obtained through an odor passage through-hole releasing said odor substance obtained through said first head.

16. An odor communication system according to claim 7, wherein said odor base management system executes an odor diffusion procedure for producing and diffusing an odor from said odor base, an odor comparison procedure for comparing and analyzing said odor produced and diffused, and an odor diffusion fine adjustment procedure for executing repeatedly said fine adjustment procedure for odor diffusion until obtaining a predetermined result based on a result of said odor comparison procedure, and terminates procedure for odor base management after obtaining a predetermined comparison result.

17. An odor communication system according to claim 16, wherein said odor comparison procedure compares odor information such as humidity, temperature, mass, and odor constituents sent from a data transmitting system with odor information such as humidity, temperature, mass, and odor constituents produced by an odor element cell storage unit being operated.

18. An odor communication system according to claim 16, wherein said odor comparison procedure compares graph data indicating odor keeping time (minute) and peak value of an odor element sent from a data transmitting system with graph data indicating odor keeping time (minute) and peak value of an odor element obtained by said odor element cell storage unit being operated.

19. An odor communication system according to claim 16, wherein said odor comparison procedure compares produced odor density with a predetermined value according to odor substance density based on relationship between sensitivity strength of a human being and impulsive strength caused by odor material density.

20. A recording medium in which a computer processing program is recorded comprising the program steps of:
   an odor diffusion procedure for producing and diffusing an odor from an odor base;
   an odor comparison procedure for analyzing produced and diffused said odors and comparing with a received odor information; and
   an odor diffusion fine adjustment procedure for repeating odor diffusion fine adjustment processing until a designated comparison result is attained based on results of said odor comparison procedure.

* * * * *

UNITED STATES PATENT AND TRADEMARK OFFICE
CERTIFICATE OF CORRECTION

PATENT NO. : 6,628,204 B1
DATED : September 30, 2003
INVENTOR(S) : Yukio Ito

It is certified that error appears in the above-identified patent and that said Letters Patent is hereby corrected as shown below:

Drawings,
Sheet 1 of 26, Fig. 1, delete "PERUIFERALS" and insert -- PERIPHERALS --

Column 1,
Line 13, delete "ankou-sha" and insert -- Tankou-sha --

Column 2,
Line 16, delete "an desired" and insert -- a desired --

Column 4,
Line 16, delete "inside" and insert -- in the inside --
Line 27, delete "comparing. and" and insert -- comparing and --

Column 5,
Line 28, delete "odor is emitted from designated" and insert -- the odor is emitted from a designated --

Column 7,
Line 1, delete "an. odor" and insert -- an odor --
Line 42, delete "inside" and insert -- in the inside --
Line 52, delete "element" and insert -- the odor element --
Line 62, delete "air" and insert -- air stream --

Column 8,
Line 9, delete "Y-axes" and insert -- Y axes --
Line 17, delete "head" and insert -- heads --

Column 9,
Line 42, delete "OBMS 32" and insert -- OB 32 --
Lines 61-62, delete "of odor" and insert -- of the odor --
Line 65, delete "Amounting" and insert -- A mounting --

Column 10,
Line 58, delete "inside" and insert -- in the inside --

Column 11,
Line 11, delete "after element" and insert -- after the odor element --
Line 22, delete "correspond to" and insert -- corresponds to --
Line 23, delete "air flow" and insert -- air flowing --
Line 24, delete "cross" and insert -- shows cross --

UNITED STATES PATENT AND TRADEMARK OFFICE
CERTIFICATE OF CORRECTION

PATENT NO.     : 6,628,204 B1
DATED          : September 30, 2003
INVENTOR(S)    : Yukio Ito It is certified that error appears in the above-identified patent and that said Letters Patent is hereby corrected as shown below:

Column 11 (cont'd),
Line 52, delete "air is" and insert -- air stream is --

Column 12,
Line 13, delete "located in the lower position of the arms"
Lines 25-26, delete "locating in the lower position"
Line 30, delete "Y-axes" and insert -- Y axes --
Line 33, delete "(vertical direction)"

Column 14,
Lines 41-42, delete "head viewed from the upper side" and insert -- heads viewed from the upper side (+z) --

Column 15,
Lines 23-25, delete "and locates above the position of the odor emitting nozzle 60 of the designated odor element cell on the nozzle movement part 180" and insert -- on the nozzle movement part 180 and locates above the position of the odor emitting nozzle 60 of the designated odor element cell --

Column 16,
Line 10, delete "cell" and insert -- cells --
Line 59, delete "air" and insert -- air stream --

Column 17,
Line 15, delete "amass" and insert -- a mass --
Line 27, delete "from odor" and insert -- from the odor --
Line 37, delete "diagram the" and insert -- diagram showing the --

Column 18,
Line 52, delete "if, the" and insert -- if the --

Column 19,
Line 55, delete " f the" and insert -- of the --

Column 21,
Line 31, delete "being 30 opened" and insert -- being opened --
Line 53, delete "an process" and insert -- an odor producing process --

UNITED STATES PATENT AND TRADEMARK OFFICE
CERTIFICATE OF CORRECTION

PATENT NO.    : 6,628,204 B1
DATED         : September 30, 2003
INVENTOR(S)   : Yukio Ito It is certified that error appears in the above-identified patent and that said Letters Patent is hereby corrected as shown below:

<u>Column 22,</u>
Line 15, delete "move both" and insert -- move in both --
Line 39, delete "odor diffusion fine" and insert -- the odor diffusion fine --

<u>Column 23,</u>
Line 9, delete "odor diffusion" and insert -- odor emission --
Lines 22-23, delete "said odor record sent from data" and insert -- an odor record sent from said data --

<u>Column 24,</u>
Line 67, delete "odor is emitted from designated" and insert -- said odor is emitted from a designated --

Signed and Sealed this

Twenty-fifth Day of May, 2004

JON W. DUDAS
*Acting Director of the United States Patent and Trademark Office*